United States Patent
Hamad et al.

(10) Patent No.: US 11,638,898 B1
(45) Date of Patent: May 2, 2023

(54) ENHANCED TAIL GAS TREATMENT OF SULFUR RECOVERY UNIT WITH STEAM SWEPT MEMBRANES

(71) Applicant: Saudi Arabian Oil Company, Dhahran (SA)

(72) Inventors: Feras Hamad, Dhahran (SA);
Sebastien A. Duval, Dhahran (SA);
Milind M. Vaidya, Dhahran (SA);
Ahmad A. Bahamdan, Dammam (SA);
Faisal D. Al-Otaibi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/704,552

(22) Filed: Mar. 25, 2022

(51) Int. Cl.
| | |
|---|---|
| *B01D 53/22* | (2006.01) |
| *B01D 53/34* | (2006.01) |
| *B01D 53/50* | (2006.01) |
| *B01D 53/75* | (2006.01) |
| *B01D 53/86* | (2006.01) |
| *C01B 17/04* | (2006.01) |

(52) U.S. Cl.
CPC ......... *B01D 53/229* (2013.01); *B01D 53/343* (2013.01); *B01D 53/50* (2013.01); *B01D 53/75* (2013.01); *B01D 53/8609* (2013.01); *B01D 53/8612* (2013.01); *C01B 17/0456* (2013.01); *B01D 2257/302* (2013.01); *B01D 2257/304* (2013.01); *B01D 2258/02* (2013.01); *B01D 2311/04* (2013.01); *B01D 2311/2634* (2013.01); *B01D 2311/2638* (2013.01); *B01D 2311/2696* (2013.01)

(58) Field of Classification Search
CPC .... B01D 53/229; B01D 53/343; B01D 53/75; B01D 53/50; B01D 53/8609; B01D 53/8612; B01D 2311/2696; B01D 2257/302; B01D 2257/304; B01D 2258/02; B01D 2311/04; B01D 2311/2634; B01D 2311/2638; C01B 17/0456
See application file for complete search history.

(56) References Cited

U.S. PATENT DOCUMENTS

| | | | |
|---|---|---|---|
| 7,901,646 | B2 | 3/2011 | Ayala et al. |
| 9,943,802 | B1 | 4/2018 | Ballaguet et al. |
| 10,106,410 | B2 | 10/2018 | Ballaguet et al. |
| 10,106,411 | B2 | 10/2018 | Ballaguet et al. |
| 10,479,684 | B2 | 11/2019 | Ballaguet et al. |
| 10,508,033 | B2 | 12/2019 | Ballaguet et al. |

FOREIGN PATENT DOCUMENTS

| | | | | |
|---|---|---|---|---|
| DE | | 35 07 617 A | * 9/1986 | ......... C01B 17/0456 |
| WO | WO 2018165512 | | 9/2018 | |
| WO | WO 2018169903 | | 9/2018 | |

OTHER PUBLICATIONS

Chen et al., "High CO2 permeability of ceramic-carbonate dual-phase hollow fiber membrane at medium-high temperature", Journal of Membrane Science, 597:117770, Mar. 2020, 10 pages.
Kim et al., "Separation performance of PEBAX/PEI hollow fiber composite membrane for SO2/CO2/N2 mixed gas," Chemical Engineering Journal, 233, Nov. 2013, 242-250, 9 pages.
Klaehn et al., "Humidified Gas stream Separation at High Temperatures Using Matrimid 5218," Separation Science and Technology, 47(14-15), Nov. 2012, 2186-2191, 6 pages.
Merkel et al., "Comparison of Hydrogen Sulfide Transport Properties in Fluorinated and Nonfluorinated Polymers" Macromolecules, 39(22), Sep. 2006, 7591-7600, 10 pages.
Ramasubramanian, "CO2 (H2S)-selective membranes for fuel cell hydrogen purification and flue gas carbon capture: an experimental and process modeling study", Dissertation for the degree of Doctor of Philosophy, Ohio State University, 2013, 270 pages.
Zou et al., "CO2—Selective polymeric membranes containing amines in crosslinked poly (vinyl alcohol)," Journal of Membrane Science, 286, Dec. 2006, 310-321, 12 pages.

\* cited by examiner

*Primary Examiner* — Timothy C Vanoy
(74) *Attorney, Agent, or Firm* — Fish & Richardson P.C.

(57) ABSTRACT

This invention relates to a system and method for improving sulfur recovery from a Claus unit. More specifically, this invention provides a steam swept membrane tail gas treatment system and method for treating acid gas streams and minimizing sulfur dioxide emissions therefrom.

19 Claims, 12 Drawing Sheets

ENHANCED TAIL GAS TREATMENT OF SULFUR RECOVERY UNIT WITH STEAM SWEPT MEMBRANES

TECHNICAL FIELD

This invention relates to a system and method for improving sulfur recovery from a Claus unit. More specifically, this invention provides a steam swept membrane tail gas treatment system and method for treating acid gas streams and minimizing sulfur dioxide emissions therefrom.

BACKGROUND

As part of natural gas processing and hydro-treatment of oil fractions, a large amount of hydrogen sulfide ($H_2S$) is produced. $H_2S$ is toxic and therefore is converted to elemental sulfur (S), which is a more practical and safer state for handling and transportation. With more stringent fuel regulations and increasing environmental concerns, together with the need to process sourer crude oils and natural gases, sulfur recovery has become one of the leading issues in emission reduction. Elemental sulfur is the ultimate state of recovery of the sulfur-containing compounds. The conversion of $H_2S$ into elemental sulfur is performed in a sulfur recovery unit (SRU). The level of sulfur recovery is increasingly emphasized as the need to minimize the amount of sulfur compounds released into the atmosphere from the recovery unit needs to be reduced in order to meet the mandated legal limits. The most common conversion process is known as the modified Claus treatment process or alternately the Claus unit or modified Claus unit. The modified Claus treatment process is a combination of thermal and catalytic processes that are used for converting gaseous $H_2S$ into elemental sulfur.

Claus unit feed gases have a wide range of compositions. Most of the feed gases originate from absorption processes using various solvents (amine, physical or hybrid solvents) to extract $H_2S$ from the by-product gases of petroleum refining and natural gas processing. The other gas plant or refinery source of $H_2S$ is the sour water stripper unit.

The first process is a thermal process (that is, in the absence of catalyst) in a reaction furnace. The feed gas to the Claus unit is burned in the reaction furnace using sufficient combustion air, or oxygen enriched air to burn a stoichiometric one-third of the contained $H_2S$. The reaction furnace pressure is maintained at about 1.5 bars (35-70 kPa above atmospheric pressure) and the temperature is maintained at about 900-1,350° C. in a "no-preheat" operation case. The $H_2S$ from the feed gas is thermally converted into elemental sulfur, along with sulfur dioxide ($SO_2$). Sulfur yield is typically around 65%-72% depending on the operation mode of the SRU. Increasing the elemental sulfur yield in the reaction furnace and subsequently the condenser is advantageous as it reduces the later load on the catalytic reactors. The reaction furnace operation is designed to maximize sulfur recovery in consideration of the feed composition, by adjusting air/oxygen feed, reaction temperature, pressure, and residence time. In addition, the reaction furnace can destroy contaminants, such as hydrocarbons, that are present in the feed gas stream. Such contaminants pose problems for the catalytic reactors through the development of carbon-sulfur compounds that can lead to plugging or deactivation of the catalyst beds.

The hot reaction product gas from the reaction furnace, containing sulfur vapor, can be used to produce high pressure steam in a waste heat boiler, which also results in cooling the product gas. The product gas is then further cooled and condensed in a heat exchanger while producing additional low pressure steam. The condensed liquid sulfur is separated from the remaining unreacted gas in the outlet end of the condenser and sent to a sulfur pit or other collection area.

The separated gas then enters the catalytic process of the Claus unit. The catalytic process contains between two and three catalytic reactors. Following the sulfur condenser, the separated gas is reheated and enters the first catalytic reactor, which is maintained at an average temperature of about 305° C. In the first catalytic reaction, about 20% of the $H_2S$ in the feed gas is converted into elemental sulfur through a reaction with the $SO_2$. The temperature is limited by the exit temperature to avoid catalytic bed damages and thermodynamic considerations. The outlet product gas from the first catalytic reactor is cooled in a second condenser, which can also produce steam. Again, the condensed liquid sulfur is separated from the remaining unreacted gas in the outlet end of the second condenser and sent to sulfur storage. The separated gas from the second condenser is sent to another re-heater and the sequence of gas reheat, catalytic reaction, condensation, and separation of liquid sulfur from unreacted gas is repeated for the second and third catalytic reactors at successively lower reactor temperatures. About 5% and 3% of the $H_2S$ in the feed gas are converted into elemental sulfur in the second reactor and third reactors, respectively.

Finally, the gas stream is released to atmosphere via a stack after passing through an incinerator, which oxidizes any remaining sulfur-containing compounds into $SO_2$. In addition, the flue gas compounds include water, nitrogen, oxygen, sulfide dioxide and eventually carbon dioxide. The eventual presence of carbon dioxide results from the acid gas composition ($CO_2$ and $H_2S$ are recovered from natural gas during a sweetening process, such as an amine process). Incinerator temperature and gas temperature in the refractory lined stack are high enough (far above gas dew point) to avoid corrosion and help with quick $SO_2$ dissemination in the surrounding air. Moreover, the stack is designed to make sure $SO_2$ concentration at ground level is below the local regulatory limit.

For a well-designed and well-operated Claus sulfur recovery plant having three catalytic reactors, an overall sulfur conversion of 96-98%, or higher, can be achieved depending on the feed gas composition. To achieve higher conversion, a tail gas treatment unit must be added to further process the exhaust gas upstream of or as an alternative to an incinerator. Tail gas treatment units are polishing units. Currently available tail gas treatment units can be effective at achieving up to 99.2% recovery but can add significant capital cost to the Claus treatment unit, often on the same order of magnitude as the Claus unit itself.

FIG. 1 provides schematic of the Claus Sulfur Recovery Unit or simply the Sulfur Recovery Unit (SRU). The SRU consists of the following unit operations:

1) Feed is mainly acid gas ($H_2S$ and $CO_2$) produced from acid gas removal units in natural gas (NG) treatment plants or refineries.

2) Acid Gas is fed to the furnace reactor (FR) where about two thirds of the $H_2S$, and all hydrocarbons exist in the feed gas, are burnt in the presence of air to form $SO_2$. The resulting temperature in the FR is very high (1700 to 2500° F.). As a result of the reaction of $H_2S$ and $SO_2$, sulfur is produced in the gas phase.

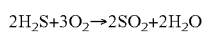

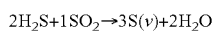

Air flow to the FR is manipulated to maintain $H_2S:SO_2$ ratio of 2:1.

3) Water is used to cool down the process gas from the FR down to about 650° F. in the Waste Heat Boiler (WHB), before it is sent to further cooling. The steam produced in WHB will be used further in supporting the plant utilities (heating, driving steam turbines to produce electrical power, or driving compressors).

4) The temperature of the process gas is further reduced in the first condenser (CD-1) to the sulfur vapor dew point, where sulfur is precipitated as liquid sulfur (S1), while the sulfur saturated gas is heated up before it is sent to the first Claus Catalytic Convertor (CV-1). Water is used to cool the process gas in the first condenser to produce steam.

5) In this catalytic convertor, $H_2S$ and $SO_2$ are further reacted on the catalyst to produce sulfur in the gas phase. This reaction is exothermic so the temperature of the process gas leaving the convertor increases.

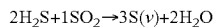

$$2H_2S+1SO_2 \rightarrow 3S(v)+2H_2O$$

6) The process gas is then sent to the second condenser (CD-2) where the temperature of the process gas is cooled down to the sulfur dew point to precipitate liquid sulfur (S2). Water is used as cooling stream in the condenser and steam is produced as a result.

7) The process gas is then preheated before it is sent to the second catalytic convertor. Direct heating or indirect heating can be used for this purpose. The process gas leaves CV-2 at higher temperature as a result of the exothermic reaction of $H_2S$ and $SO_2$ to produce sulfur.

8) The process gas leaving CV-2 is cooled down to the sulfur dew point in the third condenser (CD-3), where sulfur is precipitated as liquid (S3). Process gas is sent then for preheating step (DH-2). Water is used to cool the process gas where steam is produced as a result.

9) Process gas is pre-heated in DH-3 then sent to catalytic converter CV-3 where further reactions of $H_2S$ and $SO_2$ produce sulfur in the gas phase.

10) Process gas is cooled down in the fourth condenser to precipitate further sulfur as liquid (S4). Water is used to cool the process gas where steam is produced.

11) The process gas leaving the last condenser, referred to as tail gas, is sent to the final Thermal Oxidizer (TOX). In the TOX, fuel gas is incinerated with traces of the sulfur-containing compounds in the tail gas at a minimum temperature of 1200° F., while air flow to the incinerator is controlled to affect 2% $O_2$ in the gas released in the stack.

12) The gas leaving the incinerator is cooled down by generating steam in WHB-2, before it is released through the stack to the atmosphere.

Tail gas treatment technologies that have been developed include, but are not limited to, the Scot® process, High-sulf™, BSR/MDEA™, Sultimate™, Bechtel TGTU, and Technip TGTU. One commonly used tail gas treatment is the Amine Tail Gas Treatment process (ATGT), which operates between the last condenser and TOX in the SRU (e.g., as depicted in FIG. 2). The tail gas leaving the last condenser that contains the remainder of sulfur-containing compounds is heated up to about 450° F. before it is sent to the catalytic hydrogenation reactor (HY). Hydrogen ($H_2$) is introduced along with the process gas into the hydrogenation reactor. All sulfur-containing compounds, e.g. $SO_2$, COS, $CS_2$ are reduced/hydrolyzed to $H_2S$, which can be recovered selectively by the amine unit. In the amine unit, the gas leaving the hydrogenation reactor is cooled down in the Quench Tower (QT) to about 140° F. The clean gas leaving (sulfur lean) the amine contactor tower (AC) of the amine process is sent to TOX, while the recovered $H_2S$ (along with slipped $CO_2$) is vented from the amine regeneration (AR) and recycled back to the furnace reactor FR.

Permeation of a gas component through a membrane is driven by a difference in the partial pressure of a gas component across the membrane. Increasing the permeation rate of a gas component across a membrane can be achieved by increasing the feed gas pressure on the retentate side of the membrane, applying a vacuum on the permeate side, increasing the total area of the membrane, or using a sweep gas to dilute the permeate side.

An advantage of using a condensable sweep stream includes the ability to increase the driving force across the membrane without a large pressure ratio across the membrane where the condensable part can be knocked (precipitated) as liquid leaving behind a smaller gas stream concentrated with the non-condensable components.

The choice of tail gas treatment unit installed depends on the conversion targeted as cost is directly linked to the required conversion level. For example, the Scot® process can reach 99.9% sulfur recovery, but the added cost and unit complexity makes this process unfeasible when the Claus feed is not highly concentrated with hydrogen sulfide, e.g., greater than 55%. In addition to increasing operating and capital costs, these technologies can require significant physical footprint for the various process vessels, columns, pumps, and storage vessels necessary for operation. In addition, the gas and amine will need to be cooled down to low temperatures to maintain better absorption efficiency, especially in hot weathers.

Therefore, a process which minimizes $SO_2$ being released into the atmosphere without requiring excessive amounts of energy, equipment and materials, or process shutdown is desired. Preferably, such a process, would maintain the overall sulfur capacity of the Claus unit, while increasing the overall sulfur recovery efficiency.

SUMMARY

Provided herein is a method for removing sulfur-containing compounds from a sulfur recovery unit (SRU) tail gas stream, the method comprising the steps of:

a) introducing the SRU tail gas stream produced by the SRU to a sulfur-converting unit to produce a membrane feed;

b) introducing the membrane feed to a sulfur membrane unit, the sulfur membrane unit comprising an acid gas-selective membrane, wherein the membrane feed comprises sulfur-containing compounds;

c) allowing the membrane feed to contact a feed side of the acid gas-selective membrane such that sulfur-containing compounds permeate through the membrane to a permeate side;

d) supplying a steam feed to the permeate side of the acid gas-selective membrane to produce a sulfur concentrated stream, wherein the sulfur concentrated stream comprises sulfur-containing compounds, and wherein the heat used to produce the steam feed is sourced from the SRU boiler; and e) collecting the retentate gases that fail to permeate through the membrane to produce a sulfur lean stream retentate, wherein the sulfur lean stream retentate comprises retentate gases.

Also provided herein is an apparatus to remove sulfur-containing compounds from a sulfur recovery unit (SRU) tail gas stream, the apparatus comprising:

a) a sulfur-converting unit configured to produce a membrane feed; and b) a membrane unit fluidly connected to the converting unit, the membrane unit comprising an acid gas-selective membrane, wherein the membrane feed contacts a feed side of the acid gas-selective membrane such that the sulfur-containing compounds present in the membrane feed permeate through the acid gas-selective membrane to a permeate side, wherein the permeate side is swept with steam forming a sulfur rich stream, and wherein the heat used to produce the steam is sourced from the SRU boiler.

DETAILED DESCRIPTION

Figure 1:
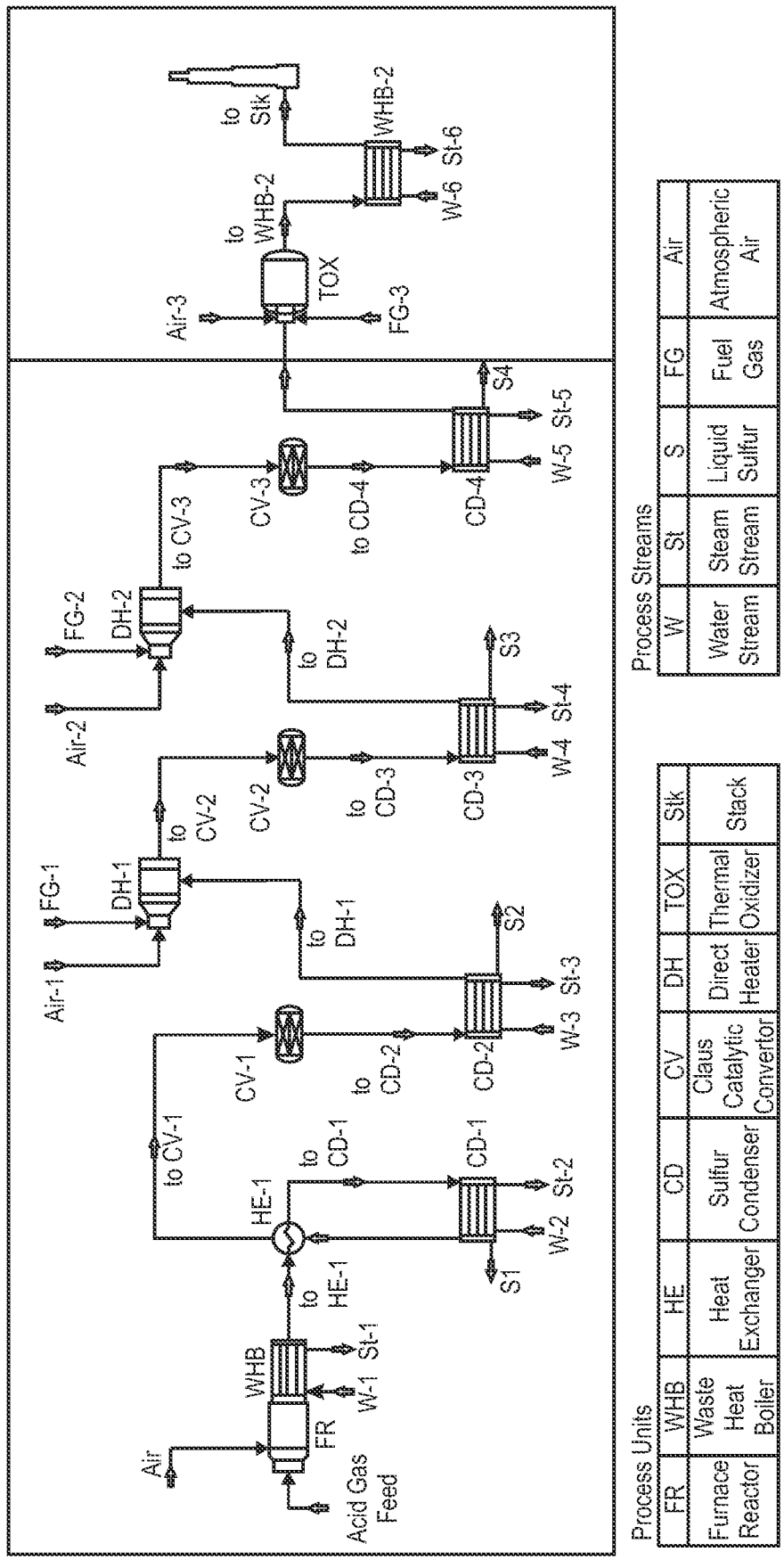
FIG. 1 is a schematic of a sulfur recovery unit (SRU).
Figure 2:
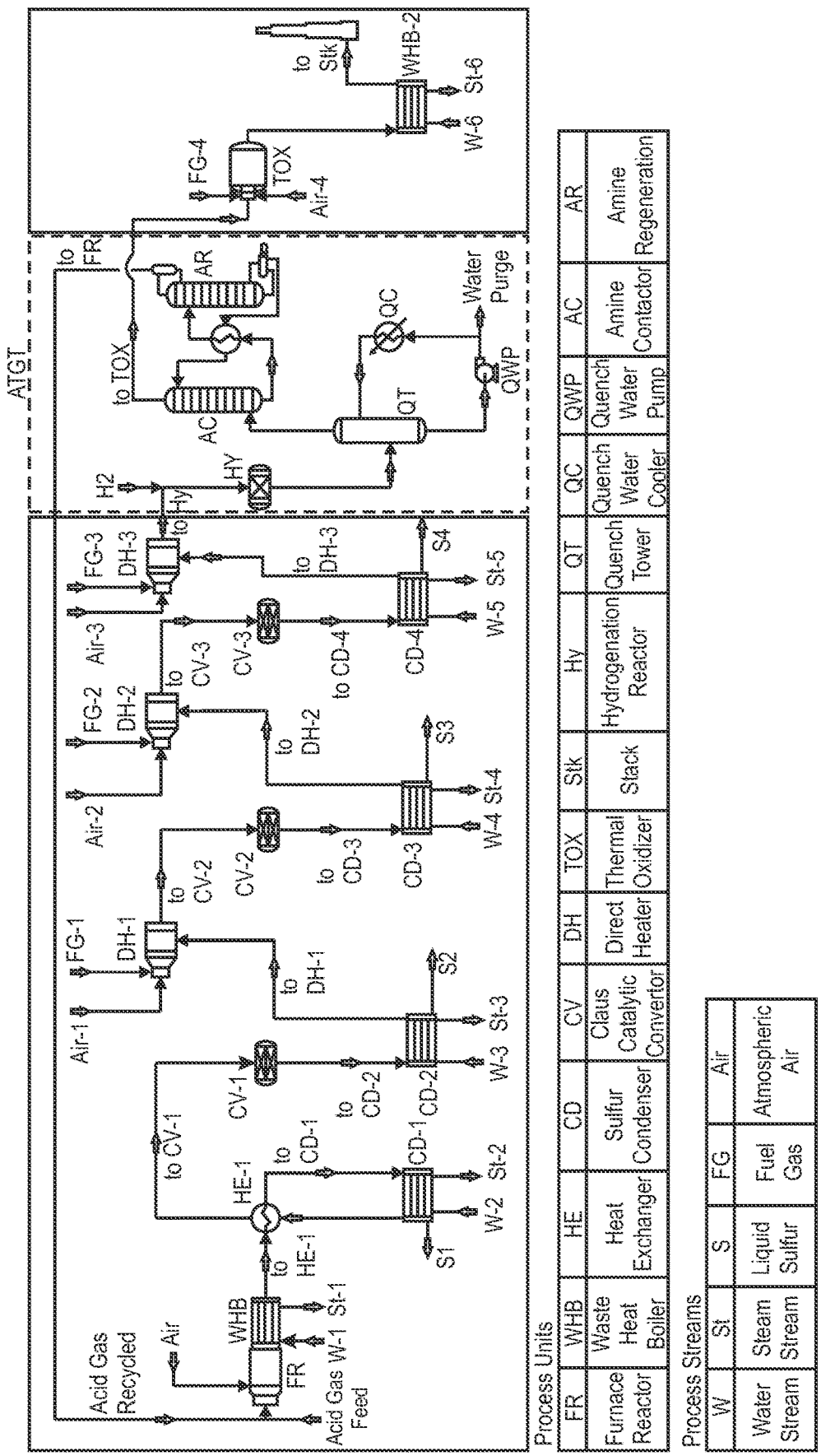
FIG. 2 is a schematic of a SRU comprising the Amine Tail Gas Treatment (ATGT) process.

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

The apparatus and methods described herein describe the conversion of sulfur-containing compounds in a tail gas stream from a sulfur recovery unit to hydrogen sulfide or sulfur dioxide, the separation of the hydrogen sulfide or sulfur dioxide in a hydrogen sulfide-selective membrane or sulfur dioxide-selective membrane, and the recycle of the hydrogen sulfide or sulfur dioxide to the inlet of the sulfur recovery unit (SRU). The conversion of sulfur-containing compounds can be achieved by reducing or oxidizing the sulfur-containing compounds. A steam sweep feed can be supplied to sweep the permeate side of the hydrogen sulfide-selective membrane or sulfur dioxide-selective membrane prior to being supplied to the reaction furnace of the sulfur recovery unit, and in doing so the steam sweep feed becomes a hydrogen sulfide or sulfur dioxide enriched feed to the reaction furnace. The steam sweep lowers the hydrogen sulfide or sulfur dioxide concentration on the permeate side of the membrane, thereby causing more hydrogen sulfide or sulfur dioxide to be drawn into the membrane from the membrane feed and sent, along with the steam sweep feed, to the sulfur recovery unit. With the steam sweep feed, the hydrogen sulfide or sulfur dioxide concentration on the permeate side is lower than the hydrogen sulfide or sulfur dioxide on the feed side of the membrane.

The process provides controlled slippage of sulfur-containing compounds to the atmosphere from an incinerator in order to meet environmental regulations or other process targets. In at least one embodiment, the use of a reducing unit in series with the hydrogen sulfide-selective membrane minimizes sulfur-containing compounds from the sulfur recovery system. In at least one embodiment, the use of an oxidizing unit in series with the sulfur dioxide-selective membrane minimizes sulfur-containing compounds from the sulfur recovery system. In one embodiment, the membrane recovers hydrogen sulfide or sulfur dioxide from the tail gas of the reducing or oxidizing unit before the tail gas is fed to an incinerator. The recovered hydrogen sulfide or sulfur dioxide is collected by sweeping the permeate side with a steam stream, which creates a hydrogen sulfide or sulfur dioxide rich stream. In at least one embodiment, the hydrogen sulfide or sulfur dioxide rich stream can be fed to the reaction furnace of the Claus process. In at least one embodiment, the use of the hydrogen sulfide-selective membrane or sulfur dioxide-selective membrane improves the Claus unit operability and efficiency to maximize elemental sulfur recovery and minimizes emissions of sulfur-containing compounds from an incinerator. In at least one embodiment, the hydrogen sulfide-selective membrane or sulfur dioxide-selective membrane and reducing or oxidizing unit can be retrofitted to an existing Claus unit or modified Claus process, regardless of the Claus unit and tail gas treatment unit.

Advantageously, the sulfur recovery system can improve the capability of a sulfur recovery unit and can reduce the costs to build and operate, thereby improving the overall economics of a sulfur recovery system.

The use of the hydrogen sulfide-selective membrane is based upon gas component separation with membranes that exhibit durable high $H_2S/CO_2$ and $H_2S/N_2$ selectivity. These selective membranes minimize recirculation of inert gases potentially present in the flue gas, such as $CO_2$ and $N_2$. The hydrogen sulfide-selective membrane produces a hydrogen sulfide-concentrated permeate fraction, which can be fed to the reaction furnace of the Claus unit along with the acid gas produced from acid gas removal units in NG treatment plants or refineries. The hydrogen sulfide-selective membrane also produces a hydrogen sulfide-depleted residue (retentate) fraction, which can be fed to the incinerator.

The use of the sulfur dioxide-selective membrane is based upon gas component separation with membranes that exhibit durable high $SO_2/CO_2$ and $SO_2/N_2$ selectivity. These selective membranes minimize recirculation of inert gases potentially present in the flue gas, such as $CO_2$ and $N_2$. The sulfur dioxide-selective membrane produces a sulfur dioxide-concentrated permeate fraction, which can be fed to the reaction furnace of the Claus unit along with the acid gas produced from acid gas removal units in NG treatment plants or refineries. The sulfur dioxide-selective membrane also produces a sulfur dioxide-depleted residue (retentate) fraction, which can be fed to the stacks.

Disclosed herein is a method for removing sulfur-containing compounds from a sulfur recovery unit (SRU) tail gas stream, the method comprising the steps of:

a) introducing the SRU tail gas stream produced by the SRU to a sulfur-converting unit to produce a membrane feed;

b) introducing the membrane feed to a sulfur membrane unit, the sulfur membrane unit comprising an acid gas-selective membrane, wherein the membrane feed comprises sulfur-containing compounds;

c) allowing the membrane feed to contact a feed side of the acid gas-selective membrane such that sulfur-containing compounds permeate through the membrane to a permeate side;

d) supplying a steam feed to the permeate side of the acid gas-selective membrane to produce a sulfur concentrated stream, wherein the sulfur concentrated stream comprises sulfur-containing compounds, and wherein the heat used to produce the steam feed is sourced from the SRU boiler; and e) collecting the retentate gases that fail to permeate through the membrane to produce a sulfur lean stream retentate, wherein the sulfur lean stream retentate comprises retentate gases.

In some embodiments, the method further comprises:

a) collecting the sulfur concentrated stream; and b) introducing the sulfur concentrated stream to the sulfur recovery unit, the sulfur recovery unit configured to produce the SRU tail gas stream.

In some embodiments, the method further comprises introducing the sulfur lean stream retentate to the final thermal oxidizer or to the stacks. In some embodiments, the method further comprises introducing the sulfur lean stream retentate to the final thermal oxidizer. In some embodiments, the method further comprises introducing the sulfur lean stream retentate to the stacks. In some embodiments, the method further comprises introducing the sulfur lean stream retentate to the SRU tail gas stream.

In some embodiments, the acid gas-selective membrane is a polymeric, ceramic, or metallic membrane. In some embodiments, the acid gas-selective membrane is made from a mix of polymeric and inorganic materials.

In some embodiments, the temperature of the membrane feed is about 212° F. to about 350° F. In some embodiments, the temperature of the membrane feed is about 225° F. to about 300° F. In some embodiments, the temperature of the membrane feed is about 230° F. to about 260° F. In some embodiments, the temperature of the membrane feed is about 245° F.

Using steam to sweep the permeate side of the membrane unit significantly enhances the concentration (chemical potential) differential driving force for permeation of acid gas components. Therefore, the process can work with low pressure ratio (feed pressure/permeate pressure). However, small boost of the tail gas stream pressure may still be needed, but substantial compression is avoided, which can significantly improve economics of the process. The use of condensable steam to sweep the permeate side of the membrane unit is also advantageous as water vapor can be knocked down as liquid water in a later stage. This results in a smaller gas stream that is concentrated with the non-condensable gases. The resulting gas stream is small and is less expensive to further process to recover the acid gases.

In some embodiments, the pressure of the steam feed is about 0 psig to about 1 psig. In some embodiments, the pressure of the steam feed is about 0 psig to about 0.5 psig. In some embodiments, the pressure of the steam feed is about 0 psig. In some embodiments, the temperature of the steam feed is about 212° F. to about 350° F. In some embodiments, the temperature of the steam feed is about 225° F. to about 300° F. In some embodiments, the temperature of the steam feed is about 230° F. to about 260° F. In some embodiments, the temperature of the steam feed is about 245° F.

In some embodiments, the SRU boiler is a waste heat boiler or a waste heat condenser. In some embodiments, the SRU boiler is a waste heat boiler. In some embodiments, the SRU boiler is a waste heat condenser. In some embodiments, the entirety of the heat required to produce the steam feed is generated from the SRU. In some embodiments, a portion of the heat required to produce the steam feed is generated from the SRU. In some embodiments, a portion of the heat required to produce the steam feed is generated from a utility boiler.

In some embodiments, the water liquid precipitated from the steam feed can be recycled with minimum treatment. In some embodiments, the water liquid precipitated from the steam feed can be recycled after further treatment.

In some embodiments, the acid gas-selective membrane separation is sweep driven.

In some embodiments, the sulfur-converting unit is a catalytic hydrogenation reactor, a catalytic oxidizer, or a thermal oxidizer. In some embodiments, the sulfur-containing compounds comprise $H_2S$ or $SO_2$. In some embodiments, the acid gas-selective membrane allows for the faster permeance of $H_2S$ or $SO_2$ over other compounds in the membrane feed. In some embodiments, the sulfur concentrated stream comprises $H_2S$ or $SO_2$.

In some embodiments, the sulfur-converting unit is a catalytic hydrogenation reactor. In some embodiments, the sulfur-containing compounds comprise $H_2S$. In some embodiments, the acid gas-selective membrane allows for faster permeance of $H_2S$ over other compounds in the membrane feed. In some embodiments, the acid gas-selective membrane has a $H_2S$ to $N_2$ permeance ratio of at least 1 and a $H_2S$ to $CO_2$ permeance ratio of at least 1. In some embodiments, the acid gas-selective membrane has a $H_2S$ to $N_2$ permeance ratio of at least 1. In some embodiments, the acid gas-selective membrane has a $H_2S$ to $CO_2$ permeance ratio of at least 1. In some embodiments, the sulfur concentrated stream comprises $H_2S$.

In some embodiments, the sulfur-converting unit is a catalytic oxidizer or thermal oxidizer. In some embodiments, the sulfur-converting unit is a catalytic oxidizer. In some embodiments, the sulfur-converting unit is a thermal oxidizer. In some embodiments, the sulfur-containing compounds comprise $SO_2$. In some embodiments, the acid gas-selective membrane allows for faster permeance of $SO_2$ over other compounds in the membrane feed. In some embodiments, the acid gas-selective membrane has a $SO_2$ to $N_2$ permeance ratio of at least 1 and a $SO_2$ to $CO_2$ permeance ratio of at least 1. In some embodiments, the acid gas-selective membrane has a $SO_2$ to $N_2$ permeance ratio of at least 1. In some embodiments, the acid gas-selective membrane has a $SO_2$ to $CO_2$ permeance ratio of at least 1. In some embodiments, the sulfur concentrated stream comprises $SO_2$.

In some embodiments, the method comprises the steps of:

a) introducing the SRU tail gas stream produced by a SRU to a catalytic hydrogenation reactor unit to produce a $H_2S$ membrane feed;

b) introducing the $H_2S$ membrane feed to a sulfur membrane unit, the sulfur membrane unit comprising an $H_2S$ selective membrane, wherein the membrane feed comprises $H_2S$;

c) allowing the membrane feed to contact a feed side of the $H_2S$ selective membrane such that $H_2S$ permeates through the membrane to a permeate side;

d) supplying a steam feed to the permeate side of the $H_2S$ selective membrane to produce a $H_2S$ concentrated stream, wherein the $H_2S$ concentrated stream comprises $H_2S$, and wherein the heat used to produce the steam feed is sourced from the SRU boiler; and e) collecting the retentate gases that fail to permeate through the $H_2S$ selective membrane to produce a $H_2S$ lean stream, wherein the $H_2S$ lean stream retentate comprises retentate gases.

In some embodiments, the method further comprises:
a) collecting the $H_2S$ concentrated stream; and
b) introducing the $H_2S$ concentrated stream to the sulfur recovery unit, the sulfur recovery unit configured to produce the SRU tail gas stream.

In some embodiments, the method further comprises:
a) collecting the $H_2S$ concentrated stream;
b) allowing the $H_2S$ concentrated stream to contact the feed side of a $CO_2$ selective membrane such that $CO_2$ permeates through the $CO_2$ selective membrane to a permeate side;
c) supplying a feed to the permeate side of the $CO_2$ selective membrane to produce a $CO_2$ concentrated stream;
d) collecting the retentate gases that fail to permeate through the $CO_2$ selective membrane to produce a $CO_2$ lean stream retentate, wherein the $CO_2$ lean stream retentate comprises $H_2S$; and
e) introducing the $CO_2$ lean stream retentate to the sulfur recovery unit, the sulfur recovery unit configured to produce the SRU tail gas stream.

In some embodiments, the feed is a steam feed, a nitrogen feed, an argon feed, or an air feed. In some embodiments, the $CO_2$ selective membrane separation is sweep driven or pressure driven. In some embodiments, the $CO_2$ selective membrane is a rubbery membrane. In some embodiments, the rubbery membrane comprises PEBAX® or polydimethylsiloxane. In some embodiments, the flow configuration of the $CO_2$ selective membrane unit is co-current, counter-current, or crossflow with the sulfur membrane unit.

In some embodiments, the method further comprises collecting the $CO_2$ concentrated stream and introducing the $CO_2$ concentrated stream to the final thermal oxidizer.

In some embodiments, the method further comprises:
a) collecting the $H_2S$ concentrated stream;
b) allowing the $H_2S$ concentrated stream to contact the feed side of a second $H_2S$ selective membrane such that $H_2S$ permeates through the second $H_2S$ selective membrane to a permeate side;
c) supplying a feed to the permeate side of the second $H_2S$ selective membrane to produce a second $H_2S$ concentrated stream; and
d) collecting the retentate gases that fail to permeate through the second $H_2S$ selective membrane to produce a second $H_2S$ lean stream retentate, wherein the second $H_2S$ lean stream retentate comprises retentate gases.

In some embodiments, the method further comprises:
a) collecting the second $H_2S$ concentrated stream; and
b) introducing the second $H_2S$ concentrated stream to the sulfur recovery unit, the sulfur recovery unit configured to produce the SRU tail gas stream.

In some embodiments, the feed is a steam feed, a nitrogen feed, an argon feed, or an air feed. In some embodiments, the second $H_2S$ selective membrane separation is sweep driven or pressure driven. In some embodiments, the second $H_2S$ selective membrane is a rubbery membrane. In some embodiments, the rubbery membrane comprises PEBAX® or polydimethylsiloxane. In some embodiments, the flow configuration of the second $H_2S$ selective membrane unit is co-current, counter-current, or crossflow with the sulfur membrane unit.

In some embodiments, the method further comprises introducing the second $H_2S$ lean stream retentate to the final thermal oxidizer. In some embodiments, the method further comprises introducing the second $H_2S$ lean stream retentate to the SRU tail gas stream.

In some embodiments, the method comprises the steps of:
a) introducing the SRU tail gas stream to a catalytic oxidizer or a thermal oxidizer unit to produce a $SO_2$ membrane feed;
b) introducing the $SO_2$ membrane feed to a sulfur membrane unit, the sulfur membrane unit comprising an $SO_2$ selective membrane, wherein the membrane feed comprises $SO_2$;
c) allowing the membrane feed to contact a feed side of the $SO_2$ selective membrane such that $SO_2$ permeates through the membrane to a permeate side;
d) supplying a steam feed to the permeate side of the $SO_2$ selective membrane to produce a $SO_2$ concentrated stream, wherein the $SO_2$ concentrated stream comprises $SO_2$, and wherein the heat used to produce the steam feed is sourced from the SRU boiler; and
e) collecting the retentate gases that fail to permeate through the $SO_2$ selective membrane to produce a $SO_2$ lean stream retentate, wherein the $SO_2$ lean stream comprises retentate gases.

In some embodiments, the method further comprises:
a) collecting the $SO_2$ concentrated stream; and
b) introducing the $SO_2$ concentrated stream to the sulfur recovery unit, the sulfur recovery unit configured to produce the SRU tail stream.

In some embodiments, the method further comprises:
a) collecting the $SO_2$ concentrated stream;
b) allowing the $SO_2$ concentrated stream to contact the feed side of a second $SO_2$ selective membrane such that $SO_2$ permeates through the second $SO_2$ selective membrane to a permeate side;
c) supplying a feed to the permeate side of the second $SO_2$ selective membrane to produce a second $SO_2$ concentrated stream; and
d) collecting the retentate gases that fail to permeate through the second $SO_2$ selective membrane to produce a second $SO_2$ lean stream retentate, wherein the second $SO_2$ lean stream retentate comprises retentate gases.

In some embodiments, the method further comprises:
a) collecting the second $SO_2$ concentrated stream; and
b) introducing the second $SO_2$ concentrated stream to the sulfur recovery unit, the sulfur recovery unit configured to produce the SRU tail gas stream.

In some embodiments, the feed is a steam feed, a nitrogen feed, an argon feed, or an air feed. In some embodiments, the second $SO_2$ selective membrane separation is sweep driven or pressure driven. In some embodiments, the second $SO_2$ selective membrane is a rubbery membrane. In some embodiments, the rubbery membrane comprises PEBAX® or polydimethylsiloxane. In some embodiments, the flow configuration of the second $SO_2$ selective membrane unit is co-current, counter-current, or crossflow with the sulfur membrane unit.

In some embodiments, the method further comprises introducing the second $SO_2$ lean stream retentate to the stacks. In some embodiments, the method further comprises introducing the second $SO_2$ lean stream retentate to the SRU tail gas stream.

Figure 4:
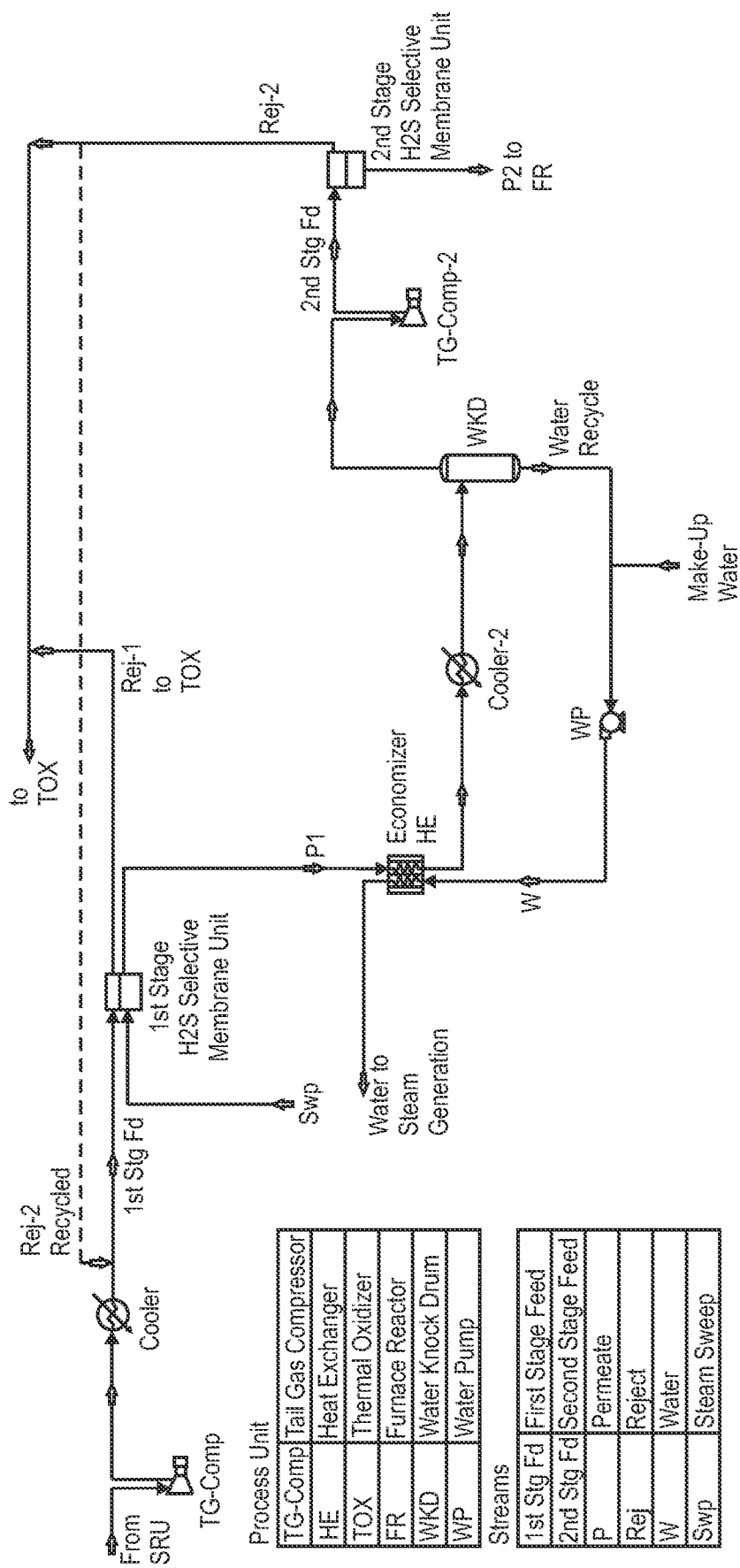
FIG. 4 is a schematic of a SSMTGT $H_2S$ route comprising two stages.
Figure 5:
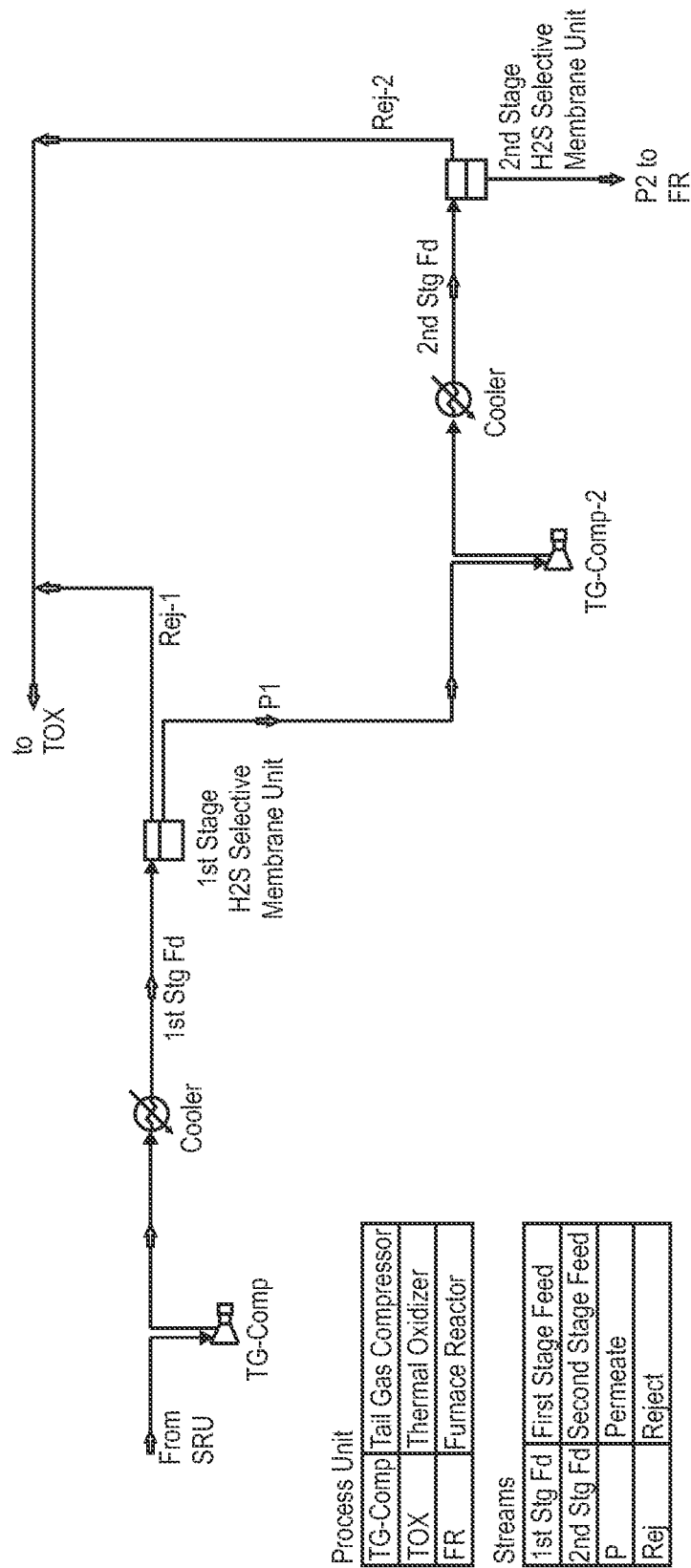
FIG. 5 is a schematic of a pressure driven membrane tail gas treatment utilizing $H_2S$-selective membranes.

FIG. 4 and FIG. 5 provide a detailed schematic of a SSMTGT for the $H_2S$ route. The stream from the SRU, after the hydrogenation reactor, is compressed and cooled to the operating temperature, e.g. 245° F. The stream is then fed to the first stage membrane unit, which is steam swept and sized to produce a reject stream (Rej-1) with $H_2S$ concentration meeting the specification.

The permeate side of the first stage is swept with low pressure steam, e.g. 0 psig and 245° F. The sweep steam is sourced from a utility boiler or from integration with SRU waste heat boilers or condensers. The permeate stream (P1), which is at high temperature, is utilized to preheat (economize) the water stream (W) sent to steam regeneration. The permeate stream (P1) is further cooled down to precipitate the majority of the water, forming the gas stream P1, in the Water Knock Drum (WKD). The precipitated water can be recycled. In FIG. 4, the recycled water, along with Make-Up water, form the water stream (W) that will heat exchange in the Economizer Heat Exchanger with the hot permeate stream (P1). The hot water stream leaving the Economizer, is sent to further heating to generate steam.

The gas stream from the Water Knock Drum, which is concentrated in $H_2S$, is sent to the second stage membrane after compressing. As shown in FIG. 4, the separation in the second stage membrane is driven only by the pressure difference. The second stage membrane could be a $H_2S$-selective membrane, e.g. rubbery membranes such PEBAX or PDMS. In this case, $H_2S$ will be recovered in the permeate stream (P2), which is kept at lower pressure, but enough to drive the flow back to the furnace reactor (FR) of the SRU. The reject stream (Rej-2), which is lean in $H_2S$, is either recycled to feed the first stage membrane or can be sent directly to TOX if it meets the emission specs.

Figure 6:
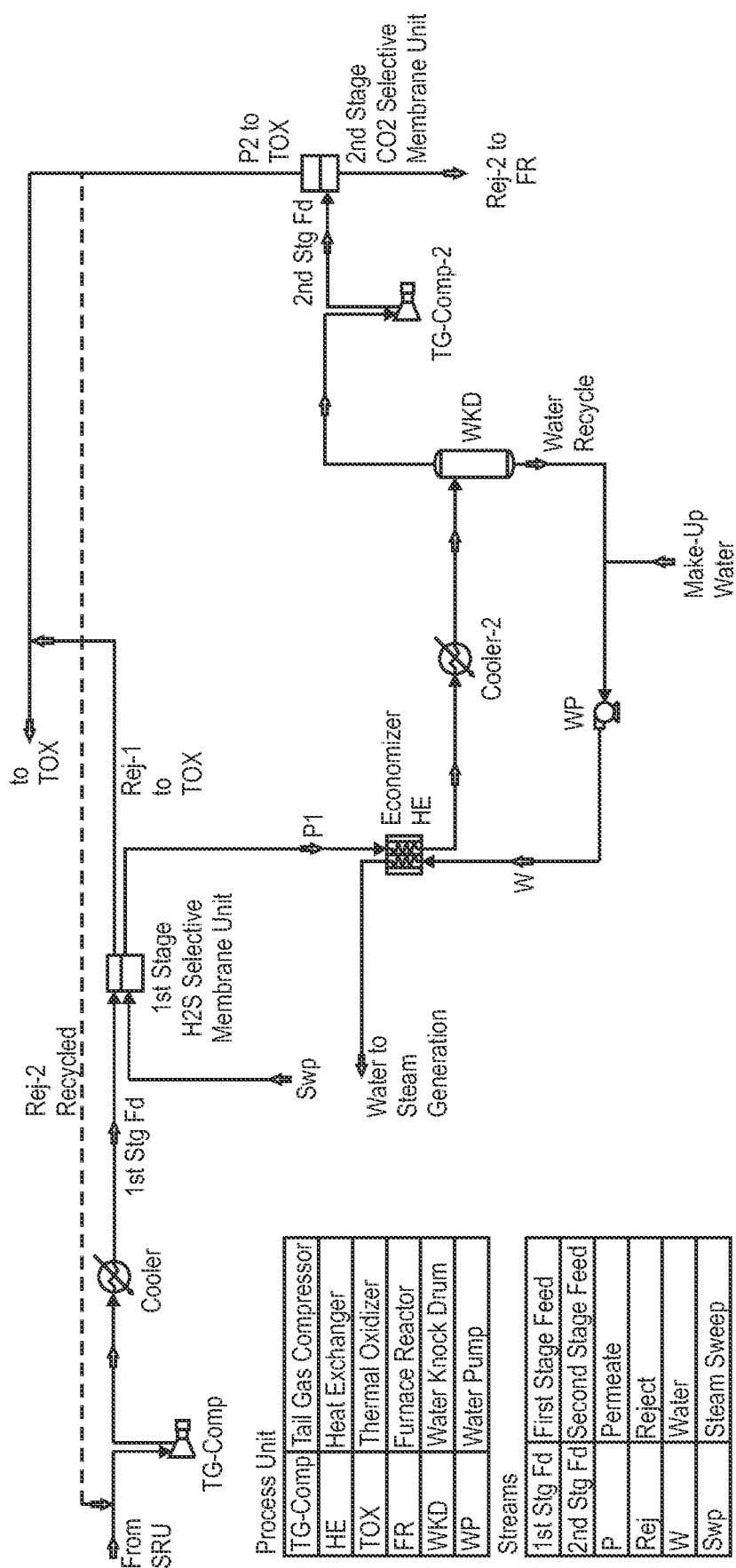
FIG. 6 is a schematic of a SSMTGT $SO_2$ route comprising two stage swept with steam.

In FIG. 6, the second stage is $CO_2$ selective membrane, where $CO_2$ is recovered in the permeate stream (P2), which will be lean in $H_2S$, while the reject stream (Rej-2) is concentrated in $H_2S$. The permeate stream (P2) can be recycled back to the suction of the first stage membrane compressor, or directed to TOX, while the reject stream (Rej-2) is recycled back to the furnace reactor (FR) of the SRU.

More pressure driven membrane stages can be added or a different configuration can be integrated with the first stage steam swept to further concentrate the $H_2S$ content in the stream recycled to the furnace reactor (FR).

As mentioned above, the steam needed to sweep the first stage can be produced by a utility boiler, or it can be produced partially or completely in the SRU by the waste heat boilers and/or condensers. The water stream (W), after the Economizer, can be recycled back partially or fully to the utility boiler, or it can be recycled partially or completely to the SRU to produce steam.

Figure 9:
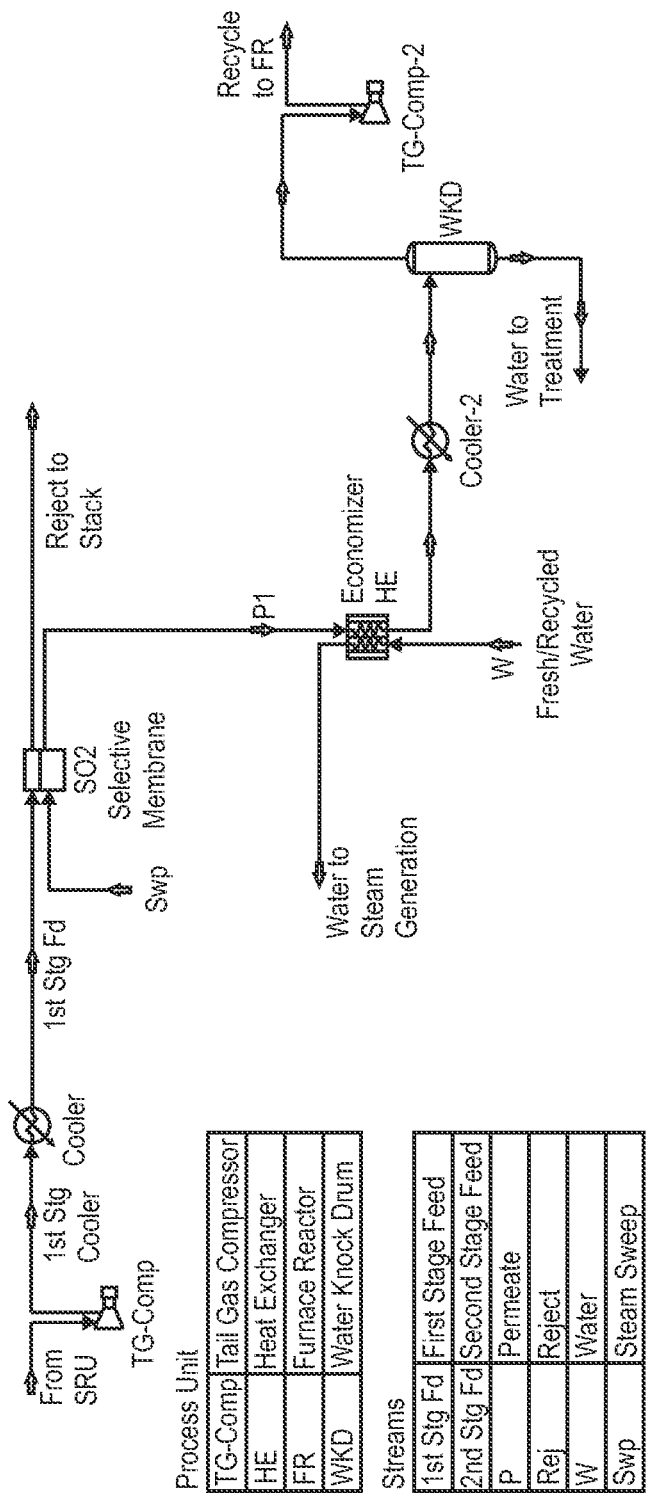
FIG. 9 is a schematic of a SSMTGT $SO_2$ route comprising one stage swept with steam.
Figure 11:
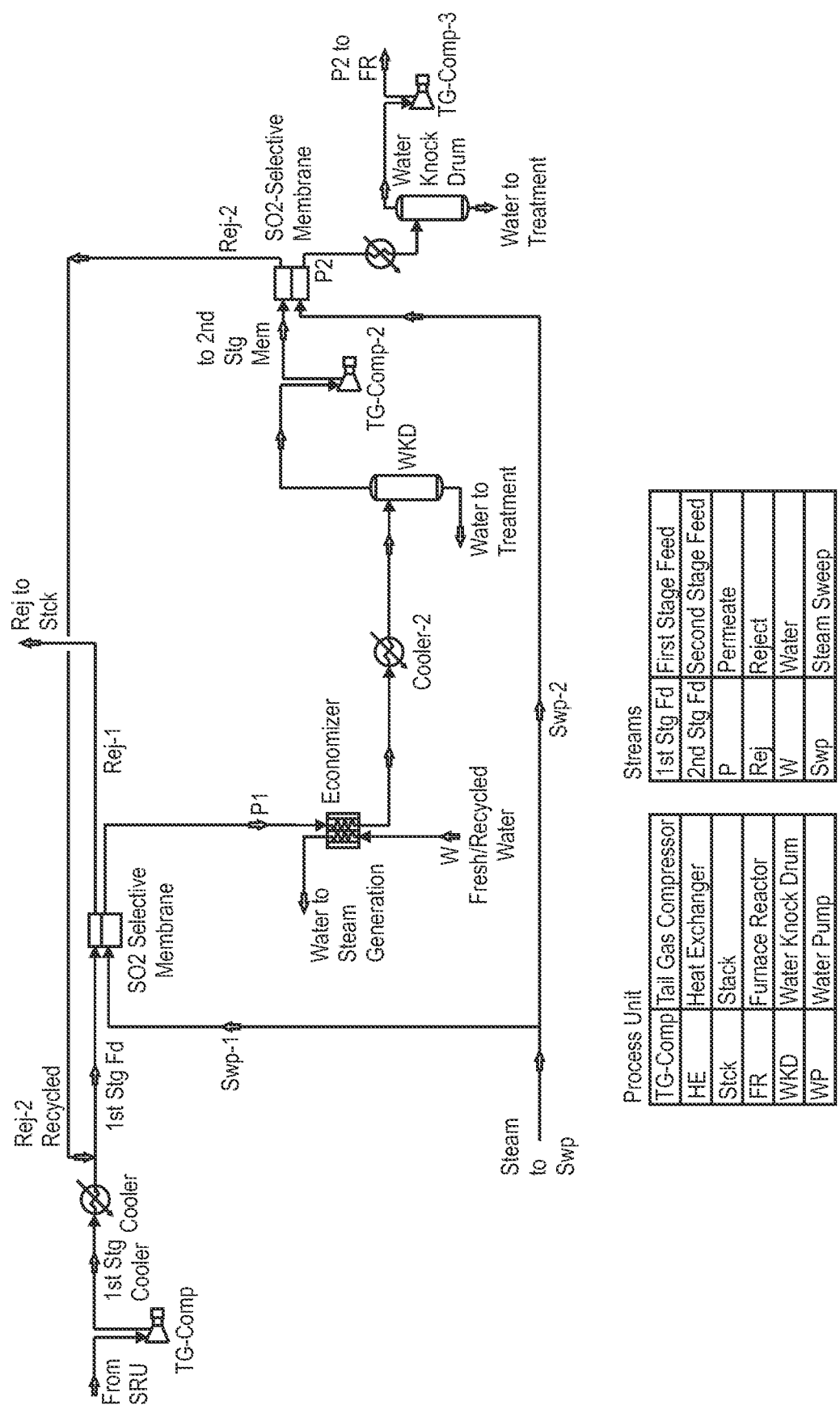
FIG. 11 is a schematic of a SSMTGT $SO_2$ route comprising two stages.

FIG. 9 and FIG. 11 provide a detailed schematic of a SSMTGT for the $SO_2$ route. The stream from SRU, after the oxidation reactor, is compressed and cooled to the operating temperature, e.g. 245° F. The stream is then fed to the first stage membrane unit, which is steam swept and sized to produce a reject stream (Rej-1) with $SO_2$ concentration meeting the specification.

The permeate side of the first stage is swept with low pressure steam, e.g. 0 psig and 245° F. The sweep steam is sourced from a utility boiler or from integration with SRU waste heat boilers or condensers. The permeate stream (P1), which is at high temperature, is utilized to preheat (economize) the water stream (W) sent to steam regeneration. The permeate stream (P1) is further cooled down to precipitate the majority of the water, forming the gas stream P1, in the Water Knock Drum (WKD). The precipitated water can be recycled.

The gas stream from the Water Knock Drum, which is concentrated in $SO_2$, is sent to the second stage membrane after compressing. As shown in FIG. 11, the separation in the second stage membrane is driven steam. The second stage membrane could be a $SO_2$ selective membrane, e.g. rubbery membranes such PEBAX or PDMS. In this case, $SO_2$ will be recovered in the permeate stream (P2). The reject stream (Rej-2), which is lean in $SO_2$, is either recycled to feed the first stage membrane or can be sent directly to the stacks if it meets the emission specs.

Apparatus

Described herein is an apparatus for removing sulfur-containing compounds from a sulfur recovery unit (SRU) tail gas stream, the apparatus comprising:

a) a sulfur-converting unit configured to produce a membrane feed; and b) a membrane unit fluidly connected to the converting unit, the membrane unit comprising an acid gas-selective membrane, wherein the membrane feed contacts a feed side of the acid gas-selective membrane such that the sulfur-containing compounds present in the membrane feed permeate through the acid gas-selective membrane to a permeate side, wherein the permeate side is swept with steam forming a sulfur rich stream, and wherein the heat used to produce the steam is sourced from the SRU boiler.

In some embodiments, the apparatus further comprises the sulfur recovery unit, the sulfur recovery unit fluidly connected to the sulfur-converting unit, the sulfur recovery unit configured to produce the SRU tail gas stream.

In some embodiments, the sulfur-converting unit is a reducing unit. In some embodiments, the reducing unit is a catalytic hydrogenation reactor.

In some embodiments, the apparatus comprises:

a) a reducing unit configured to produce a membrane feed, wherein the membrane feed comprises $H_2S$; and b) a membrane unit fluidly connected to the reducing unit, the membrane unit comprising a $H_2S$ selective membrane, wherein the membrane feed contacts a feed side of the membrane such that the $H_2S$ present in the membrane feed permeates through the $H_2S$ selective membrane to a permeate side, wherein the permeate side is swept with steam forming a sulfur rich stream, and wherein the heat used to produce the steam is sourced from an SRU boiler.

In some embodiments, the apparatus further comprises a sulfur recovery unit, the sulfur recovery unit fluidly connected to the reducing unit, the sulfur recovery unit configured to produce the SRU tail gas stream.

In some embodiments, the apparatus further comprises a second membrane unit fluidly connected to the membrane unit.

In some embodiments, the second membrane unit comprises a $CO_2$ selective membrane, wherein the sulfur rich stream contacts a feed side of the membrane such that the $CO_2$ present in the sulfur rich stream permeates through the $CO_2$ selective membrane to a permeate side.

In some embodiments, the second membrane unit comprises a $H_2S$ selective membrane, wherein the sulfur rich stream contacts a feed side of the membrane such that the $H_2S$ present in the sulfur rich stream permeates through the $H_2S$ selective membrane to a permeate side.

In some embodiments, the sulfur rich stream is re-introduced into the sulfur recovery unit.

In some embodiments, the sulfur-converting unit is an oxidizing unit. In some embodiments, the oxidizing unit is a catalytic oxidizer. In some embodiments, the oxidizing unit is a thermal oxidizer.

In some embodiments, the apparatus comprises:

a) an oxidizing unit configured to produce a membrane feed, wherein the membrane feed comprises $SO_2$, and b) a membrane unit fluidly connected to the oxidizing unit, the membrane unit comprising a $SO_2$ selective membrane, wherein the membrane feed contacts a feed side of the $SO_2$ selective membrane such that the $SO_2$ present in the membrane feed permeates through the membrane to a permeate side, wherein the permeate side is swept with steam forming a sulfur rich stream, and wherein the heat used to produce the steam is sourced from an SRU boiler.

In some embodiments, the apparatus further comprises the sulfur recovery unit, the sulfur recovery unit fluidly connected to the oxidizing unit, the sulfur recovery unit configured to produce the SRU tail gas stream.

In some embodiments, the apparatus further comprises a second membrane unit fluidly connected to the membrane unit.

In some embodiments, the second membrane unit comprises a $SO_2$ selective membrane, wherein the sulfur rich stream contacts a feed side of the membrane such that the $SO_2$ present in the sulfur rich stream permeates through the $SO_2$ selective membrane to a permeate side.

In some embodiments, the sulfur rich stream is re-introduced into the sulfur recovery unit.

Definitions

As used herein, "sulfur-containing compounds" refers to compounds that contain sulfur that can be products or reactants in the reactions of the sulfur recovery unit. The term sulfur-containing compounds is meant to be a catchall for sulfur-containing compounds. Examples of sulfur-containing compounds include, but are not limited to, hydrogen sulfide, sulfur dioxide, carbonyl sulfur, carbon disulfide, and combinations of the same.

As used here, "allowable sulfur dioxide emission limit" refers to a rate of release of sulfur dioxide into the atmosphere. The rate of release can be mandated by federal, state, or local agencies.

As used here, "air" refers to the collective gases that constitute earth's atmosphere. Air contains nitrogen, oxygen, argon, carbon dioxide, and water vapor. Unless otherwise indicated, oxygen-enriched air is considered air with an oxygen content of greater than 21% by volume on a dry basis. Unless otherwise indicated, the use of the term air includes all of the gases listed.

As used here, "overall recovery of sulfur" or "sulfur recovery" refers to the percentage of sulfur removed based on the amount of sulfur present in the acid gas feed stream. A recovery of 99.0% means that 99.0% of the sulfur in the acid gas feed stream is recovered as part of the recovered sulfur stream.

As used here, "permeate," as a verb means to spread through or flow through or pass through a membrane of a membrane unit. As an example, liquids and gases can permeate a membrane. As a noun, permeate can refer to the liquids and gases that have permeated the membrane of a membrane unit.

As used here, "sweep" refers to a gas stream that passes continuously by a membrane, such that the permeate does not sit statically against the permeate side of the membrane but is collected by the gas stream. The sweep can provide the driving force for the separation.

As used here, "reducing," "reduction," or "reduction reactions" refers to a chemical reaction where a reactant gains electrons through the gain of a hydrogen atom.

As used here, "oxidizing," "oxidation," or "oxidation reactions" refers to a chemical reaction where a reactant loses electrons.

As used here, "stacks" refer to a gas combustion device that gases produced from an SRU pass through before entering the atmosphere.

As used here, a "selective membrane" refers to semi-permeable barriers that allow faster permeance of some compounds over other compounds.

As used here, a "final thermal oxidizer" or "TOX" is a thermal oxidizer that a stream passes through before the stream is passed through a waste heat boiler that is connected to the stacks.

The term "about" as used in connection with a numerical value throughout the specification and the claims denotes an interval of accuracy, familiar and acceptable to a person skilled in the art. Such interval of accuracy is, for example, ±10%.

EXAMPLES

Example 1. Reference SRU Process

The following example illustrates the reference SRU process as depicted in FIG. 1, including the TOX. Table 1-1 provides the material balance around the SRU process. Table 1-2 details the air and fuel gas requirements. Table 1-3 summarizes the liquid sulfur produced in the condensers of the SRU.

To assess the sulfur recovery rate of the SRU, the following equation is used: % Sulfur recovery=(mole rate liquid sulfur produced/mole rate of sulfur in Acid Gas feed). The acid gas fed to the SRU is 10.0 MMSCFD (~1098 lbmol/hr) containing 76.23% (mol) $H_2S$. Table 1-3 provides the molar rate and elemental sulfur content of the condensed liquid sulfur streams.

% Sulfur recovery=(570.9*0.9995+129*0.9998+ 95.2*1.0+25.3*1.0)/(1098.0*0.7623)=97.98%

TABLE 1-1

| Stream Name | Acid Gas Feed | FR | to HE-1 | to CD-1 | CD-1 out | to CV-1 | To CD-2 | to DH-1 |
|---|---|---|---|---|---|---|---|---|
| Vapour/Phase Fraction | 1.0 | 1.0 | 1.0 | 1.0 | 1.0 | 1.0 | 1.0 | 1.0 |
| Temperature [F.] | 131 | 2312 | 800 | 620 | 355 | 605 | 470 | 324 |
| Pressure [psig] | 9.0 | 6.6 | 5.6 | 5.6 | 5.1 | 4.7 | 2.4 | 1.9 |
| Molar Flow [MMSCFD] | 10.0 | 28.5 | 26.7 | 26.6 | 25.8 | 25.8 | 25.8 | 25.7 |
| Mol Fraction | | | | | | | | |
| Nitrogen | 0.0000 | 0.4728 | 0.5042 | 0.5069 | 0.5214 | 0.5213 | 0.5354 | 0.5379 |
| $CO_2$ | 0.1304 | 0.0377 | 0.0403 | 0.0405 | 0.0416 | 0.0416 | 0.0471 | 0.0473 |

TABLE 1-1-continued

| | | | | | | | | |
|---|---|---|---|---|---|---|---|---|
| $H_2S$ | 0.7623 | 0.0493 | 0.0526 | 0.0529 | 0.0543 | 0.0543 | 0.0076 | 0.0076 |
| COS | 0.0000 | 0.0030 | 0.0032 | 0.0032 | 0.0033 | 0.0033 | 0.0000 | 0.0000 |
| $SO_2$ | 0.0000 | 0.0265 | 0.0282 | 0.0284 | 0.0292 | 0.0292 | 0.0039 | 0.0039 |
| $CS_2$ | 0.0000 | 0.0003 | 0.0003 | 0.0003 | 0.0003 | 0.0003 | 0.0000 | 0.0000 |
| $H_2O$ | 0.0980 | 0.2792 | 0.2978 | 0.2993 | 0.3079 | 0.3079 | 0.3597 | 0.3614 |
| S1_Vapor | 0.0000 | 0.0000 | 0.0000 | 0.0000 | 0.0000 | 0.0000 | 0.0000 | 0.0000 |
| S2_Vapor | 0.0000 | 0.0934 | 0.0048 | 0.0003 | 0.0000 | 0.0001 | 0.0000 | 0.0000 |
| S3_Vapor | 0.0000 | 0.0005 | 0.0008 | 0.0001 | 0.0000 | 0.0000 | 0.0000 | 0.0000 |
| S4_Vapor | 0.0000 | 0.0000 | 0.0004 | 0.0000 | 0.0000 | 0.0000 | 0.0000 | 0.0000 |
| S5_Vapor | 0.0000 | 0.0000 | 0.0015 | 0.0006 | 0.0000 | 0.0000 | 0.0001 | 0.0000 |
| S6_Vapor | 0.0000 | 0.0000 | 0.0110 | 0.0083 | 0.0002 | 0.0004 | 0.0013 | 0.0001 |
| S7_Vapor | 0.0000 | 0.0000 | 0.0077 | 0.0063 | 0.0001 | 0.0002 | 0.0008 | 0.0000 |
| S8_Vapor | 0.0000 | 0.0000 | 0.0074 | 0.0130 | 0.0006 | 0.0003 | 0.0029 | 0.0003 |
| Other gases** | 0.0094 | 0.0372 | 0.0397 | 0.0399 | 0.0411 | 0.0411 | 0.0413 | 0.0414 |

| Stream Name | To CV-2 | to CD-3 | to DH-2 | to CV-3 | to CD-4 | to DH-3 | to Hy | to HE-2 |
|---|---|---|---|---|---|---|---|---|
| Vapour/Phase Fraction | 1.0 | 1.0 | 1.0 | 1.0 | 1.0 | 1.0 | 1.0 | 1.0 |
| Temperature [F.] | 410 | 470 | 324 | 390 | 401 | 265 | 1203 | 230 |
| Pressure [psig] | 3.5 | 2.4 | 1.9 | 1.4 | 1.4 | 1.2 | 1.2 | 1.2 |
| Molar Flow [MMSCFD] | 26.0 | 25.8 | 25.7 | 26.1 | 26.1 | 26.1 | 39.0 | 39.0 |
| Mol Fraction | | | | | | | | |
| Nitrogen | 0.5319 | 0.5354 | 0.4432 | 0.4472 | 0.4476 | 0.4480 | 0.4554 | 0.4561 |
| $CO_2$ | 0.0467 | 0.0471 | 0.2130 | 0.2108 | 0.2110 | 0.2112 | 0.2071 | 0.2173 |
| $H_2S$ | 0.0294 | 0.0076 | 0.0059 | 0.0058 | 0.0028 | 0.0028 | 0.0027 | 0.0049 |
| COS | 0.0001 | 0.0000 | 0.0001 | 0.0001 | 0.0000 | 0.0000 | 0.0000 | 0.0000 |
| $SO_2$ | 0.0149 | 0.0039 | 0.0031 | 0.0030 | 0.0015 | 0.0015 | 0.0015 | 0.0000 |
| $CS_2$ | 0.0000 | 0.0000 | 0.0001 | 0.0001 | 0.0001 | 0.0001 | 0.0001 | 0.0000 |
| $H_2O$ | 0.3355 | 0.3597 | 0.3022 | 0.3009 | 0.3042 | 0.3045 | 0.3020 | 0.2956 |
| S1_Vapor | 0.0000 | 0.0000 | 0.0000 | 0.0000 | 0.0000 | 0.0000 | 0.0000 | 0.0000 |
| S2_Vapor | 0.0000 | 0.0000 | 0.0000 | 0.0000 | 0.0000 | 0.0000 | 0.0000 | 0.0000 |
| S3_Vapor | 0.0000 | 0.0000 | 0.0000 | 0.0000 | 0.0000 | 0.0000 | 0.0000 | 0.0000 |
| S4_Vapor | 0.0000 | 0.0000 | 0.0000 | 0.0000 | 0.0000 | 0.0000 | 0.0000 | 0.0000 |
| S5_Vapor | 0.0000 | 0.0001 | 0.0000 | 0.0000 | 0.0000 | 0.0000 | 0.0000 | 0.0000 |
| S6_Vapor | 0.0001 | 0.0013 | 0.0001 | 0.0001 | 0.0003 | 0.0000 | 0.0000 | 0.0000 |
| S7_Vapor | 0.0001 | 0.0008 | 0.0000 | 0.0001 | 0.0001 | 0.0000 | 0.0000 | 0.0000 |
| S8_Vapor | 0.0003 | 0.0029 | 0.0003 | 0.0003 | 0.0006 | 0.0001 | 0.0000 | 0.0000 |
| Other gases** | 0.0410 | 0.0413 | 0.0322 | 0.0318 | 0.0318 | 0.0318 | 0.0310 | 0.0261 |

**Other gases: hydrocarbons, argon (Ar), carbon monoxide (CO), hydrogen ($H_2$)

TABLE 1-2

| Stream Name | Air | Air-1 | Air-2 | Air to TOX | FG-1 | FG-2 | FG to TOX |
|---|---|---|---|---|---|---|---|
| Vapour/Phase Fraction | 1.0 | 1.0 | 1.0 | 1.0 | 1.0 | 1.0 | 1.0 |
| Temperature [F.] | 120 | 120 | 120 | 120 | 100 | 100 | 100 |
| Pressure [psig] | 9 | 9 | 9 | 9 | 50 | 50 | 50 |
| Molar Flow [MMSCFD] | 18.4 | 0.473 | 0.41 | 12.54 | 0.06 | 0.06 | 0.06 |
| Mol Fraction | | | | | | | |
| Argon | 0.0088 | 0.0088 | 0.0088 | 0.0088 | | | |
| Oxygen | 0.1964 | 0.1964 | 0.1964 | 0.1964 | | | |
| Nitrogen | 0.732 | 0.732 | 0.732 | 0.732 | 0.03 | 0.03 | 0.03 |
| $CO_2$ | 0.0003 | 0.0003 | 0.0003 | 0.0003 | 0.02 | 0.02 | 0.02 |
| $H_2O$ | 0.0626 | 0.0626 | 0.0626 | 0.0626 | | | |
| Hydrogen | | | | | 0.07 | 0.07 | 0.07 |
| Methane | | | | | 0.76 | 0.76 | 0.76 |
| Ethane | | | | | 0.07 | 0.07 | 0.07 |
| Propane | | | | | 0.05 | 0.05 | 0.05 |

TABLE 1-3

| Stream Name | S1 | S2 | S3 | S4 |
|---|---|---|---|---|
| Vapour/Phase Fraction | 0 | 0 | 0 | 0 |
| Temperature [F.] | 355 | 332 | 324 | 265 |
| Pressure [psig] | 5.1 | 3.5 | 1.9 | 1.2 |
| Molar Flow [lbmol/hr] | 570.9 | 129 | 95.2 | 25.3 |
| Mol Fraction | | | | |
| $H_2S$ | 0.0005 | 0.0002 | 0.0000 | 0.0000 |
| S_Liquid | 0.9995 | 0.9998 | 1.0000 | 1.0000 |

Example 2. SSMTGT $H_2S$ Route

Figure 3A:
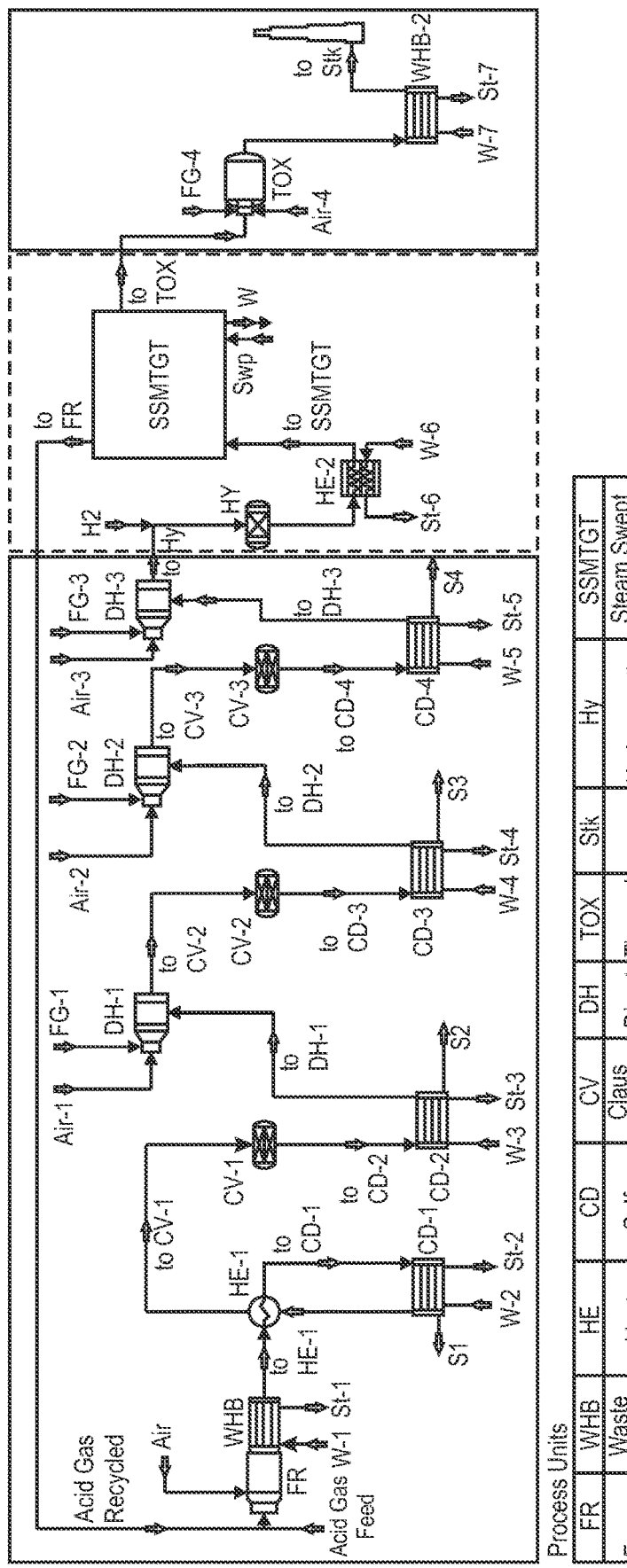
FIG. 3A is a schematic of a SRU comprising the $H_2S$ route of the steam swept membrane tail gas treatment (SSMTGT) process.

This example illustrates the integration of the SSMTGT with SRU according to FIG. 3A. The SSMTGT is made of the two stages, according to FIG. 4; the $1^{st}$ stage is a facilitated transport membrane unit, while the $2^{nd}$ membrane stage is a $H_2S$-Selective pressure driven unit. The reject stream of the $2^{nd}$ stage (Rej-2) is consolidated with the reject stream of the $1^{st}$ stage (Rej-1), and the resulting stream is directed to the TOX.

Table 2-1 through Table 2-3 provide the material balance around the SRU and TOX. The details of the fuel gas and air required by the process are detailed in Table 2-2. The recovered liquid sulfur is detailed in Table 2-3. On the other hand, Table 2-4 provides the material balance of the SSMTGT.

Table 2-5 provides the performance of the $1^{st}$ stage (e.g. Facilitated Transport Membrane (FTM)) and the second stage pressure driven $H_2S$-selective membrane. Table 2-6 provides the membrane units size and compression power. The first stage of the membrane process is swept with about 47 MMSCFD of steam at 245° F., from which about 43.4 MMSCFD is recovered as liquid water from its permeate stream (P1). As a result, the $H_2S$ in the remaining gas is concentrated from about (0.0031) in (P1) to about (0.0234) in the feed to the $2^{nd}$ stage $H_2S$-selective membrane unit.

The sulfur recovery of the overall SRU+SSMTGT is:

% SRU recovery=(547.5*0.9997+164.1*0.9998+99.2*1.0+25.8*1.0)/(1098*0.7623)*100=99.91%

TABLE 2-1

| Stream Name | Acid Gas Feed | Acid Gas Recycled | FR | To HE-1 | To CD-1 | CD-1 out | To CV-1 | To CD-2 | To DH-1 | To CV-2 | To CD-3 |
|---|---|---|---|---|---|---|---|---|---|---|---|
| Vapor/Phase Fraction | 1.0 | 1.0 | 1.0 | 1.0 | 1.0 | 1.0 | 1.0 | 1.0 | 1.0 | 1.0 | 1.0 |
| Temp [F.] | 131 | 140 | 1949 | 800 | 620 | 355 | 593 | 663 | 332 | 410 | 457 |
| Pressure [psig] | 9.0 | 15.0 | 6.6 | 5.6 | 5.6 | 5.1 | 4.7 | 4 | 3.5 | 3.5 | 2.4 |
| Molar Flow [MMSCFD] | 10.0 | 6.0 | 34.9 | 33.2 | 33.1 | 32.4 | 32.4 | 32.1 | 31.9 | 32.6 | 32.4 |
| Mol Fraction | | | | | | | | | | | |
| Nitrogen | 0.0000 | 0.0015 | 0.3964 | 0.4165 | 0.4184 | 0.4277 | 0.4276 | 0.431 | 0.4341 | 0.4391 | 0.4415 |
| $CO_2$ | 0.1304 | 0.9473 | 0.1936 | 0.2035 | 0.2044 | 0.2089 | 0.2089 | 0.2121 | 0.2136 | 0.211 | 0.2122 |
| $H_2S$ | 0.7623 | 0.0268 | 0.0467 | 0.0491 | 0.0493 | 0.0503 | 0.0503 | 0.0243 | 0.0245 | 0.024 | 0.0058 |
| COS | 0.0000 | 0.0000 | 0.0003 | 0.0003 | 0.0003 | 0.0003 | 0.0003 | 0.0001 | 0.0001 | 0.0001 | 0.0001 |
| $SO_2$ | 0.0000 | 0.0000 | 0.0248 | 0.026 | 0.0261 | 0.0267 | 0.0267 | 0.0123 | 0.0124 | 0.0121 | 0.0031 |
| $CS_2$ | 0.0000 | 0.0000 | 0.0013 | 0.0013 | 0.0013 | 0.0014 | 0.0014 | 0.0001 | 0.0001 | 0.0001 | 0.0001 |
| $H_2O$ | 0.098 | 0.0238 | 0.2335 | 0.2454 | 0.2465 | 0.2519 | 0.2519 | 0.2803 | 0.2823 | 0.2812 | 0.301 |
| S1_Vapor | 0.0000 | 0.0000 | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0734 | 0.0045 | 0.0003 | 0.0000 | 0.0001 | 0.0005 | 0.0000 | 0.0000 | 0.0000 |
| S3_Vapor | 0.0000 | 0.0000 | 0.0006 | 0.0007 | 0.0001 | 0.0000 | 0.0000 | 0.0001 | 0.0000 | 0.0000 | 0.0000 |
| S4_Vapor | 0.0000 | 0.0000 | 0.0000 | 0.0004 | 0.0000 | 0.0000 | 0.0000 | 0.0000 | 0.0000 | 0.0000 | 0.0000 |
| S5_Vapor | 0.0000 | 0.0000 | 0.0000 | 0.0012 | 0.0005 | 0.0000 | 0.0000 | 0.0003 | 0.0000 | 0.0000 | 0.0000 |
| S6_Vapor | 0.0000 | 0.0000 | 0.0000 | 0.0088 | 0.0068 | 0.0002 | 0.0004 | 0.0028 | 0.0001 | 0.0001 | 0.0011 |
| S7_Vapor | 0.0000 | 0.0000 | 0.0000 | 0.0059 | 0.0049 | 0.0001 | 0.0002 | 0.0017 | 0.0000 | 0.0001 | 0.0006 |
| S8_Vapor | 0.0000 | 0.0000 | 0.0000 | 0.0055 | 0.0098 | 0.0006 | 0.0003 | 0.0023 | 0.0004 | 0.0003 | 0.0025 |
| Other gases** | 0.0094 | 0.0006 | 0.0296 | 0.0311 | 0.0312 | 0.0319 | 0.0319 | 0.0321 | 0.0324 | 0.0319 | 0.032 |

| Stream Name | to DH-2 | to CV-3 | to CD-4 | to DH-3 | to Hy | to HE-2 | to SSMTGT | to TOX | To WHB-2 | To Stck |
|---|---|---|---|---|---|---|---|---|---|---|
| Vapour/Phase Fraction | 1.0 | 1.0 | 1.0 | 1.0 | 1.0 | 1.0 | 1.0 | 1.0 | 1.0 | 1.0 |
| Temperature [F.] | 324 | 390 | 398 | 265 | 390 | 428 | 230 | 240 | 1206 | 230 |
| Pressure [psig] | 1.9 | 1.4 | 1.4 | 1.2 | 1.2 | 1.2 | 1.2 | 1.0 | 0 | 0 |
| Molar Flow [MMSCFD] | 32.3 | 32.9 | 32.8 | 32.8 | 34 | 33.9 | 33.9 | 26.24 | 39.85 | 39.85 |
| Mol Fraction | | | | | | | | | | |
| Nitrogen | 0.4432 | 0.4472 | 0.4476 | 0.448 | 0.4554 | 0.4561 | 0.4561 | 0.5889 | 0.627 | 0.627 |
| $CO_2$ | 0.213 | 0.2108 | 0.211 | 0.2112 | 0.2071 | 0.2173 | 0.2173 | 0.0636 | 0.062 | 0.062 |
| $H_2S$ | 0.0059 | 0.0058 | 0.0028 | 0.0028 | 0.0027 | 0.0049 | 0.0049 | 0.0002 | 0.0000 | 0.0000 |
| COS | 0.0001 | 0.0001 | 0.0000 | 0.0000 | 0.0000 | 0.0000 | 0.0000 | 0.0000 | 0.0000 | 0.0000 |
| $SO_2$ | 0.0031 | 0.003 | 0.0015 | 0.0015 | 0.0015 | 0.0000 | 0.0000 | 0.0000 | 0.0001 | 0.0001 |
| $CS_2$ | 0.0001 | 0.0001 | 0.0001 | 0.0001 | 0.0001 | 0.0000 | 0.0000 | 0.0000 | 0.0000 | 0.0000 |
| $H_2O$ | 0.3022 | 0.3009 | 0.3042 | 0.3045 | 0.302 | 0.2956 | 0.2956 | 0.3138 | 0.2746 | 0.2746 |
| S1_Vapor | 0.0000 | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0000 | 0.0000 | 0.0000 | 0.0000 | 0.0000 | 0.0000 | 0.0000 | 0.0000 |

TABLE 2-1-continued

| | | | | | | | | | | |
|---|---|---|---|---|---|---|---|---|---|---|
| S3_Vapor | 0.0000 | 0.0000 | 0.0000 | 0.0000 | 0.0000 | 0.0000 | 0.0000 | 0.0000 | 0.0000 | 0.0000 |
| S4_Vapor | 0.0000 | 0.0000 | 0.0000 | 0.0000 | 0.0000 | 0.0000 | 0.0000 | 0.0000 | 0.0000 | 0.0000 |
| S5_Vapor | 0.0000 | 0.0000 | 0.0000 | 0.0000 | 0.0000 | 0.0000 | 0.0000 | 0.0000 | 0.0000 | 0.0000 |
| S6_Vapor | 0.0001 | 0.0001 | 0.0003 | 0.0000 | 0.0000 | 0.0000 | 0.0000 | 0.0000 | 0.0000 | 0.0000 |
| S7_Vapor | 0 | 0.0001 | 0.0001 | 0.0000 | 0.0000 | 0.0000 | 0.0000 | 0.0000 | 0.0000 | 0.0000 |
| S8_Vapor | 0.0003 | 0.0003 | 0.0006 | 0.0001 | 0.0000 | 0.0000 | 0.0000 | 0.0000 | 0.0000 | 0.0000 |
| Other gases** | 0.0322 | 0.0318 | 0.0318 | 0.0318 | 0.031 | 0.0261 | 0.0261 | 0.0336 | 0.0162 | 0.0162 |

**Other gases: hydrocarbons, argon (Ar), carbon monoxide (CO), hydrogen ($H_2$)

TABLE 2-2

| Stream Name | Air | Air-1 | Air-2 | Air-3 | Air to TOX | FG-1 | FG-2 | FG-3 | FG to TOX |
|---|---|---|---|---|---|---|---|---|---|
| Vapour/Phase Fraction | 1.0 | 1.0 | 1.0 | 1.0 | 1.0 | 1.0 | 1.0 | 1.0 | 1.0 |
| Temperature [F.] | 120 | 120 | 120 | 120 | 120 | 100 | 100 | 100 | 100 |
| Pressure [psig] | 9 | 9 | 9 | 9 | 9 | 50 | 50 | 50 | 50 |
| Molar Flow [MMSCFD] | 18.9 | 0.63 | 0.53 | 1.03 | 12.98 | 0.06 | 0.05 | 0.1 | 0.78 |
| Mol Fraction | | | | | | | | | |
| Argon | 0.0088 | 0.0088 | 0.0088 | 0.0088 | 0.0088 | | | | |
| Oxygen | 0.1964 | 0.1964 | 0.1964 | 0.1964 | 0.1964 | | | | |
| Nitrogen | 0.732 | 0.732 | 0.732 | 0.732 | 0.732 | 0.03 | 0.03 | 0.03 | 0.03 |
| CO2 | 0.0003 | 0.0003 | 0.0003 | 0.0003 | 0.0003 | 0.02 | 0.02 | 0.02 | 0.02 |
| H2O | 0.0626 | 0.0626 | 0.0626 | 0.0626 | 0.0626 | | | | |
| Hydrogen | | | | | | 0.07 | 0.07 | 0.07 | 0.07 |
| Methane | | | | | | 0.76 | 0.76 | 0.76 | 0.76 |
| Ethane | | | | | | 0.07 | 0.07 | 0.07 | 0.07 |
| Propane | | | | | | 0.05 | 0.05 | 0.05 | 0.05 |

TABLE 2-3

| Stream Name | S1 | S2 | S3 | S4 |
|---|---|---|---|---|
| Vapour/Phase Fraction | 0 | 0 | 0 | 0 |
| Temperature [F.] | 355 | 332 | 324 | 265 |
| Pressure [psig] | 5.1 | 3.5 | 1.9 | 1.2 |
| Molar Flow [lbmol/hr] | 547.5 | 164.1 | 99.16 | 25.78 |
| Mol Fraction | | | | |
| $H_2S$ | 0.0005 | 0.0002 | 0 | 0 |
| S_Liquid | 0.9995 | 0.9998 | 1 | 1 |

TABLE 2-4

| Stream Name | 1st stg fd | Rej-1 to TOX | Swp | P1 | to Snd stg Comp | Water Recycled | 2nd Stg Fd | P2 to SRU | Rej-2 to TOX | To TOX |
|---|---|---|---|---|---|---|---|---|---|---|
| Vapour/Phase Fraction | 1.00 | 1.00 | 1.00 | 1.00 | 1.00 | 0.00 | 1.00 | 1.00 | 1.00 | 1.00 |
| Temperature [F.] | 245 | 245 | 245 | 245 | 140 | 140 | 140 | 140 | 140 | 240 |
| Pressure [psig] | 30 | 30 | 0 | 0 | 0 | 0 | 125 | 15 | 125 | 30 |
| Molar Flow [MMSCFD] | 30.6 | 25.3 | 47 | 51.9 | 8.5 | 43.4 | 6.95 | 6.02 | 0.93 | 26.2 |
| Mol Fraction | | | | | | | | | | |
| Nitrogen | 0.506 | 0.605 | 0.0000 | 0.003 | 0.0183 | 0.0000 | 0.0223 | 0.0015 | 0.1565 | 0.5889 |
| $CO_2$ | 0.241 | 0.0349 | 0.0002 | 0.1252 | 0.7647 | 0.0003 | 0.9324 | 0.9473 | 0.8362 | 0.0636 |
| $H_2S$ | 0.0054 | 0.0002 | 0.0000 | 0.0031 | 0.0192 | 0.0000 | 0.0234 | 0.0268 | 0.0014 | 0.0002 |
| $H_2O$ | 0.2187 | 0.3254 | 0.9998 | 0.8685 | 0.1968 | 0.9997 | 0.0206 | 0.0238 | 0.0002 | 0.3138 |
| Other gases* | 0.0289 | 0.0345 | 0.0000 | 0.0002 | 0.001 | 0.0000 | 0.0013 | 0.0006 | 0.0057 | 0.0336 |

*Other gases: include argon (Ar), carbon monoxide (CO), hydrogen ($H_2$)

TABLE 2-5

| Gas Component | FTM (Gas/Nitrogen) | $H_2S$-selective Membrane (Gas/Nitrogen) |
|---|---|---|
| Nitrogen | 1.0 | 1.0 |
| $CO_2$ | 250 | 44.7 |
| $H_2S$ | 500 | 161 |
| $H_2O$ | 2190 | 323 |
| Other Gases ** | 1.0 | 3.2 |
| Gas Permeance | | |
| $H_2S$ Permeance (GPU) | 500 | 161 |

** Other gases: include argon (Ar), carbon monoxide (CO), hydrogen ($H_2$)

TABLE 2-6

| 1st Stage (FTM) | |
|---|---|
| Membrane size (m²) | 19,681 |
| TG-Comp (MW)*** | 1.88 |
| 2nd Stage $H_2S$-Selective | |
| Membrane size (m²) | 1505 |
| TG-Comp-2 (MW)*** | 1.02 |

***Polytropic efficiency~77.6%

Example 3. SSMTGT $H_2S$ Route

This example constructs comparison with Example 2 to illustrate the impact of using pressure driven membrane in the first stage, replacing the steam swept facilitated transport membrane. As well, the impact of the feed pressure to the first stage on the size of the membrane units and compression power requirement is illustrated. Both membrane stages have performance factors similar to the second stage membrane unit in Example 2, i.e. $H_2S$-Selective Membrane performance factors shown in Table 2-5. The pressure of the feed and permeate streams of the second stage is maintained similar to that in Example 2, i.e. 125 psig and 15 psig, respectively. Table 3-1 shows the impact of the first stage feed pressure on the overall membrane process size and compression.

TABLE 3-1

| 1st Stage Feed Pressure (psig) | 1st Stage feed (MMSCFD) | 1st Stage Size (m2) | 2nd Stage feed (MMSCFD) | 2nd Stage Size (m2) | TG-Comp-1 | TG-Comp-2 |
|---|---|---|---|---|---|---|
| 30 | 26.8 | 175,300 | 11.9 | 6,600 | 1.69 | 1.61 |
| 60 | 24.9 | 46,700 | 8.8 | 3,700 | 2.34 | 1.16 |
| 90 | 23.9 | 21,500 | 7.4 | 2,800 | 2.76 | 0.96 |

It is clear from comparing Table 3-1 and Table 2-6 that the pressure-driven $H_2S$ selective membrane requires higher $1^{st}$ stage feed pressure, about 90 psig, to have comparable membrane size to that of the SSMTGT illustrated in Table 2-6, where about 30% more compression is required.

Example 4. SSMTGT $H_2S$ Route

As noted in Example 2, the $1^{st}$ stage of SSMTGT is swept with about 47.0 MMSCFD of low-pressure steam at (0.0 psig and 245° F.). This steam can be produced by a utility boiler.

Example 5. SSMTGT $H_2S$ Route

As noted in Example 2, the $1^{st}$ stage of SSMTGT is swept with about 47.0 MMSCFD of low-pressure steam at (0.0 psig and 245° F.). This steam can be produced (fully) by integrating with the SRU WHB and/or condensers and TOX WHB-2. FIG. 4 shows that the water precipitated in the Water Knock Drum, is recycled along with the Make-Up Water to the economizer to cool down the hot P1 stream. The Water to Steam Generation stream produced from the economizer is sent to the SRU and distributed to the waste-heat-boilers (WHB and WHB-2), the sulfur condensers CD-1 to CD-4, and pre-cooler HE-2.

Figure 7:
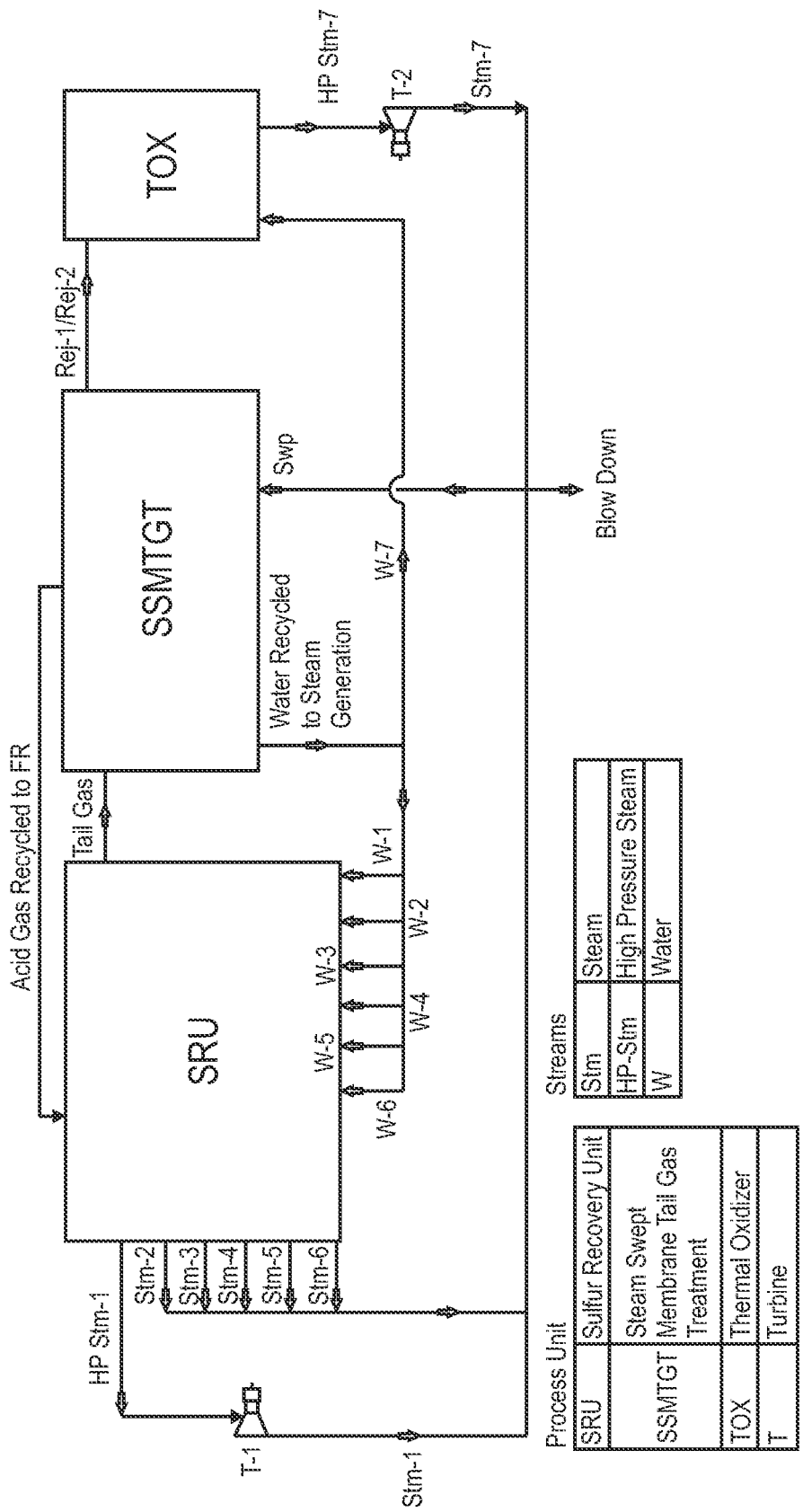
FIG. 7 is a schematic of a SSMTGT process integrated with SRU waste heat boilers and condensers and final thermal oxidizer waste heat boilers.

FIG. 7 illustrates the integration of the steam generation required by the SSMTGT with the SRU and its TOX. Table 5-1 details the distribution of the water and steam generation. As noted, WHB and WHB-2 produces high pressure steam (500 psig), while the sulfur condensers and pre-cooler HE-2 produce low pressure steam. The high-pressure steam streams (HP Stm-1 and HP Stm-7) produced in WHB and WHB-2 can be utilized for electrical power generation or to drive TG-Comp-1 and TG-Comp-2, as noted in Table 5-2.

TABLE 5-1

| Stream Name | Water Recycled | Water Make-UP | Water to Steam Generation | St-1 | St-2 | St-3 |
|---|---|---|---|---|---|---|
| Vapour/Phase Fraction | 0.00 | 0.00 | 0.00 | 1.00 | 1.00 | 1.00 |
| Temp. [F.] | 140 | 120 | 218 | 715 | 250 | 250 |
| Pressure [psig] | 0 | 0 | 500 | 500 | 5 | 5 |
| Molar Flow [MMSCFD] | | | | 16.3 | 4.4 | 5 |
| Mass Flow [lb/hr] | 85,912 | 11,007 | 96,919 | 32,137 | 8,784 | 9,965 |

| Stream Name | St-4 | St-5 | St-6 | St-7 | Swp | Blow Down |
|---|---|---|---|---|---|---|
| Vapour/Phase Fraction | 1.00 | 1.00 | 1.00 | 1.00 | 1.00 | 1.00 |
| Temp. [F.] | 250 | 250 | 250 | 250 | 250 | 250 |
| Pressure [psig] | 5 | 5 | 5 | 500 | 0 | 0 |

TABLE 5-1-continued

| | | | | | | |
|---|---|---|---|---|---|---|
| Molar Flow [MMSCFD] | 2 | 2 | 4.1 | 15.2 | 47.0 | 2.0 |
| Mass Flow [lb/hr] | 4,025 | 4,024 | 8,031 | 30,082 | 92,972 | 3,873 |

TABLE 5-2

| Turbine | Power Produced (MW)** |
|---|---|
| T-1 | 1.84 |
| T-2 | 1.72 |

**Polytropic efficiency~72%.

Example-6. SSMTGT $H_2S$ Route

Figure 8:
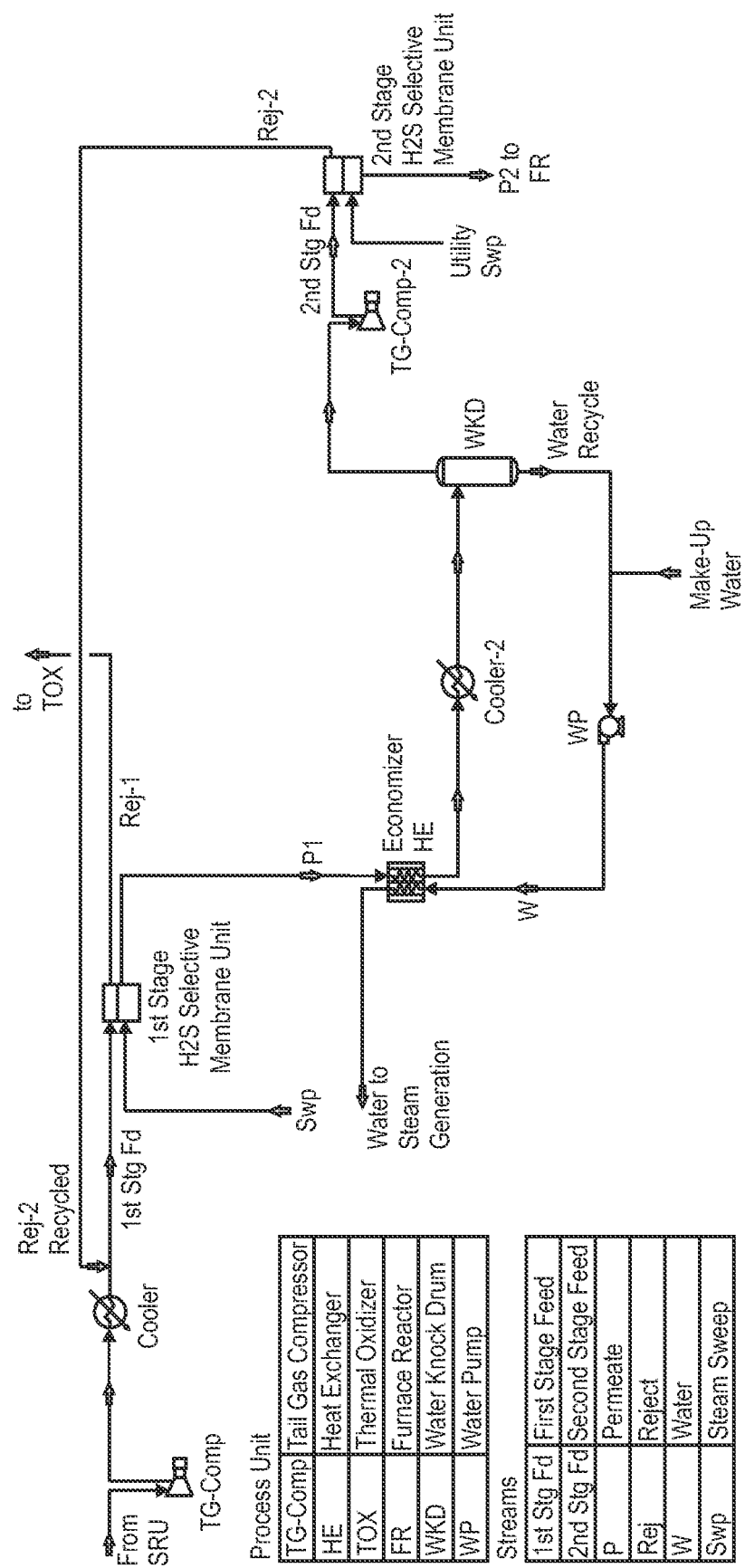
FIG. 8 is a schematic of a SSMTGT $H_2S$ route comprising two stages swept with steam.

In this example, the SSMTGT consists of two stages that are swept with low pressure steam, as illustrated in FIG. 8. In this example, the steam used to sweep the $1^{st}$ stage membrane unit is produced by integrating the steam cycle with the SRU and TOX waste heat boilers and condensers, as illustrated in FIG. 5. However, the steam used to sweep the $2^{nd}$ stage unit, is imported from plant utility boiler, while the water precipitated in the Water Know Drum on the (P2) stream is recycled back to the plant utility boiler.

Table 6-1 provides the mass balance around the SRU and TOX. Table 6-2 details Air and Fuel Gas streams of the SRU and TOX. Table 6-3 details the liquid sulfur produced in the condensers of the SRU. Table 6-4 material balance around the SSMTGT process. Table 6-5 details steam production integrating with the waste heat boilers and condensers of the SRU and TOX. Table 6-6 performance of FTM and $H_2S$-selective membranes. Table 6-6 membrane unit size and compression power required by the SSMTGT.

TABLE 6-1

| Stream Name | Acid Gas Feed | Acid Gas Recycled | FR | to HE-1 | to CD-1 | CD-1 out | to CV-1 | To CD-2 | to DH-1 | To CV-2 | to CD-3 |
|---|---|---|---|---|---|---|---|---|---|---|---|
| Vapor/Phase Fraction | 1.0 | 1.0 | 1.0 | 1.0 | 1.0 | 1.0 | 1.0 | 1.0 | 1.0 | 1.0 | 1.0 |
| Temp [F.] | 131 | 270 | 1959 | 800 | 620 | 355 | 592 | 664 | 332 | 410 | 460 |
| Pressure [psig] | 9.0 | 15.0 | 6.6 | 5.6 | 5.6 | 5.1 | 4.7 | 4.0 | 3.5 | 3.5 | 2.4 |
| Molar Flow [MMSCFD] | 10.0 | 6.1 | 35 | 33.4 | 33.2 | 32.5 | 32.5 | 32.3 | 32 | 32.7 | 32.5 |
| Mol Fraction | | | | | | | | | | | |
| Nitrogen | 0.0000 | 0.0001 | 0.3952 | 0.4148 | 0.4167 | 0.4256 | 0.4256 | 0.429 | 0.4322 | 0.4372 | 0.4397 |
| $CO_2$ | 0.1304 | 0.775 | 0.1667 | 0.175 | 0.1758 | 0.1796 | 0.1796 | 0.1823 | 0.1837 | 0.1817 | 0.1828 |
| $H_2S$ | 0.7623 | 0.0282 | 0.049 | 0.0515 | 0.0517 | 0.0527 | 0.0527 | 0.0259 | 0.0261 | 0.0255 | 0.0063 |
| COS | 0.0000 | 0.0000 | 0.0002 | 0.0002 | 0.0002 | 0.0002 | 0.0002 | 0.0001 | 0.0001 | 0.0001 | 0.0000 |
| $SO_2$ | 0.0000 | 0.0000 | 0.0261 | 0.0274 | 0.0275 | 0.0281 | 0.0281 | 0.0134 | 0.0135 | 0.0132 | 0.0036 |
| $CS_2$ | 0.0000 | 0.0000 | 0.0012 | 0.0012 | 0.0013 | 0.0013 | 0.0013 | 0.0001 | 0.0001 | 0.0001 | 0.0001 |
| $H_2O$ | 0.098 | 0.1968 | 0.2591 | 0.2719 | 0.2732 | 0.2791 | 0.279 | 0.3085 | 0.3108 | 0.3091 | 0.3303 |
| S1_Vapor | 0.0000 | 0.0000 | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0716 | 0.0044 | 0.0003 | 0.0000 | 0.0001 | 0.0005 | 0.0000 | 0.0000 | 0.0000 |
| S3_Vapor | 0.0000 | 0.0000 | 0.0006 | 0.0007 | 0.0000 | 0.0000 | 0.0000 | 0.0001 | 0.0000 | 0.0000 | 0.0000 |
| S4_Vapor | 0.0000 | 0.0000 | 0.0000 | 0.0004 | 0.0000 | 0.0000 | 0.0000 | 0.0000 | 0.0000 | 0.0000 | 0.0000 |
| S5_Vapor | 0.0000 | 0.0000 | 0.0000 | 0.0012 | 0.0005 | 0.0000 | 0.0000 | 0.0003 | 0.0000 | 0.0000 | 0.0001 |
| S6_Vapor | 0.0000 | 0.0000 | 0.0000 | 0.0086 | 0.0066 | 0.0002 | 0.0004 | 0.0029 | 0.0001 | 0.0001 | 0.0011 |
| S7_Vapor | 0.0000 | 0.0000 | 0.0000 | 0.0057 | 0.0048 | 0.0001 | 0.0002 | 0.0017 | 0.0000 | 0.0001 | 0.0007 |
| S8_Vapor | 0.0000 | 0.0000 | 0.0000 | 0.0053 | 0.0095 | 0.0006 | 0.0003 | 0.0024 | 0.0004 | 0.0003 | 0.0026 |
| Other gases** | 0.0094 | 0.0000 | 0.0303 | 0.0318 | 0.0319 | 0.0326 | 0.0326 | 0.0329 | 0.0331 | 0.0326 | 0.0328 |

| Stream Name | to DH-2 | to CV-3 | to CD-4 | to DH-3 | to Hy | to HE-2 | to SSMTGT | to TOX | To WHB-2 | To Stck |
|---|---|---|---|---|---|---|---|---|---|---|
| Vapour/Phase Fraction | 1.0 | 1.0 | 1.0 | 1.0 | 1.0 | 1.0 | 1.0 | 1 | 1 | 1 |
| Temperature [F.] | 324 | 390 | 399 | 265 | 390 | 430 | 230 | 245 | 1200 | 230 |
| Pressure [psig] | 1.9 | 1.4 | 1.4 | 1.2 | 1.2 | 1.2 | 1.2 | 30 | 30 | 30 |
| Molar Flow [MMSCFD] | 32.4 | 33.0 | 32.9 | 32.9 | 34.0 | 34.0 | 34.0 | 26.41 | 39.95 | 39.95 |
| Mol Fraction | | | | | | | | | | |
| Nitrogen | 0.4415 | 0.4455 | 0.4459 | 0.4464 | 0.4538 | 0.4546 | 0.4546 | 0.5848 | 0.6241 | 0.6241 |
| $CO_2$ | 0.1836 | 0.1819 | 0.182 | 0.1822 | 0.1792 | 0.1882 | 0.1882 | 0.0595 | 0.0593 | 0.0593 |
| $H_2S$ | 0.0063 | 0.0062 | 0.0029 | 0.0029 | 0.0028 | 0.0052 | 0.0052 | 0.0003 | 0.0000 | 0.0000 |
| COS | 0.0000 | 0.0000 | 0.0000 | 0.0000 | 0.0000 | 0.0000 | 0.0000 | 0.0000 | 0.0000 | 0.0000 |
| $SO_2$ | 0.0036 | 0.0035 | 0.0019 | 0.0019 | 0.0018 | 0.0000 | 0.0000 | 0.0000 | 0.00018 | 0.00018 |
| $CS_2$ | 0.0001 | 0.0001 | 0.0001 | 0.0001 | 0.0001 | 0.0000 | 0.0000 | 0.0000 | 0.0000 | 0.0000 |
| $H_2O$ | 0.3317 | 0.3299 | 0.3335 | 0.3339 | 0.3305 | 0.326 | 0.326 | 0.3221 | 0.2803 | 0.2803 |
| S1_Vapor | 0.0000 | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0000 | 0.0000 | 0.0000 | 0.0000 | 0.0000 | 0.0000 | 0.0000 | 0.0000 |

TABLE 6-1-continued

| | | | | | | | | | | |
|---|---|---|---|---|---|---|---|---|---|---|
| S3_Vapor | 0.0000 | 0.0000 | 0.0000 | 0.0000 | 0.0000 | 0.0000 | 0.0000 | 0.0000 | 0.0000 | 0.0000 |
| S4_Vapor | 0.0000 | 0.0000 | 0.0000 | 0.0000 | 0.0000 | 0.0000 | 0.0000 | 0.0000 | 0.0000 | 0.0000 |
| S5_Vapor | 0.0000 | 0.0000 | 0.0000 | 0.0000 | 0.0000 | 0.0000 | 0.0000 | 0.0000 | 0.0000 | 0.0000 |
| S6_Vapor | 0.0001 | 0.0001 | 0.0003 | 0.0000 | 0.0000 | 0.0000 | 0.0000 | 0.0000 | 0.0000 | 0.0000 |
| S7_Vapor | 0 | 0.0001 | 0.0001 | 0.0000 | 0.0000 | 0.0000 | 0.0000 | 0.0000 | 0.0000 | 0.0000 |
| S8_Vapor | 0.0003 | 0.0003 | 0.0007 | 0.0001 | 0.0000 | 0.0000 | 0.0000 | 0.0000 | 0.0000 | 0.0000 |
| Other gases** | 0.0329 | 0.0325 | 0.0325 | 0.0326 | 0.0318 | 0.0259 | 0.0259 | 0.0333 | 0.0161 | 0.0161 |

**Other gases: hydrocarbons, argon (Ar), carbon monoxide (CO), hydrogen ($H_2$)

TABLE 6-2

| Stream Name | Air | Air-1 | Air-2 | Air-3 | Air to TOX | FG-1 | FG-2 | FG-3 | FG to TOX |
|---|---|---|---|---|---|---|---|---|---|
| Vapour/Phase Fraction | 1.0 | 1.0 | 1.0 | 1.0 | 1.0 | 1.0 | 1.0 | 1.0 | 1.0 |
| Temperature [F.] | 120 | 120 | 120 | 120 | 120 | 100 | 100 | 100 | 100 |
| Pressure [psig] | 9 | 9 | 9 | 9 | 9 | 50 | 50 | 50 | 50 |
| Molar Flow [MMSCFD] | 18.85 | 0.63 | 0.53 | 1.03 | 12.92 | 0.06 | 0.05 | 0.10 | 0.77 |
| Mol Fraction | | | | | | | | | |
| Argon | 0.0088 | 0.0088 | 0.0088 | 0.0088 | 0.0088 | | | | |
| Oxygen | 0.1964 | 0.1964 | 0.1964 | 0.1964 | 0.1964 | | | | |
| Nitrogen | 0.732 | 0.732 | 0.732 | 0.732 | 0.732 | 0.03 | 0.03 | 0.03 | 0.03 |
| $CO_2$ | 0.0003 | 0.0003 | 0.0003 | 0.0003 | 0.0003 | 0.02 | 0.02 | 0.02 | 0.02 |
| $H_2O$ | 0.0626 | 0.0626 | 0.0626 | 0.0626 | 0.0626 | | | | |
| Hydrogen | | | | | | 0.07 | 0.07 | 0.07 | 0.07 |
| Methane | | | | | | 0.76 | 0.76 | 0.76 | 0.76 |
| Ethane | | | | | | 0.07 | 0.07 | 0.07 | 0.07 |
| Propane | | | | | | 0.05 | 0.05 | 0.05 | 0.05 |

TABLE 6-3

| Stream Name | S1 | S2 | S3 | S4 |
|---|---|---|---|---|
| Vapour/Phase Fraction | 0.0 | 0.0 | 0.0 | 0.0 |
| Temperature [F.] | 355 | 332 | 324 | 265 |
| Pressure [psig] | 5.1 | 3.5 | 1.9 | 1.2 |
| Molar Flow | 534.6 | 168.2 | 105.9 | 27.82 |
| Mol Fraction | | | | |
| $H_2S$ | 0.0005 | 0.0002 | 0.0000 | 0.0000 |
| S_Liquid | 0.9995 | 0.9998 | 1.0000 | 1.0000 |

TABLE 6-4

| Stream Name | 1 st stg fd | Rej-1 to TOX | Swp | P1 | to 2nd stg Comp | Water Recycled |
|---|---|---|---|---|---|---|
| Vapour/Phase Fraction | 1.00 | 1.00 | 1.00 | 1.00 | 1.00 | 0.00 |
| Temperature [F.] | 245 | 245 | 245 | 245 | 140 | 140 |
| Pressure [psig] | 30 | 30 | 0 | 0 | 0 | 0 |
| Molar Flow [MMSCFD] | 37.3 | 26.4 | 47 | 57.4 | 13.9 | 43.5 |
| Mol Fraction | | | | | | |
| Nitrogen | 0.4184 | 0.5847 | 0 | 0.0027 | 0.0111 | 0.0000 |
| $CO_2$ | 0.3321 | 0.0598 | 0 | 0.1869 | 0.7731 | 0.0003 |
| $H_2S$ | 0.00703 | 0.0003 | 0 | 0.0045 | 0.0184 | 0.0000 |
| $H_2O$ | 0.2187 | 0.3221 | 1.0000 | 0.8058 | 0.1968 | 0.9997 |
| Other gases* | 0.0237 | 0.0332 | 0.0000 | 0.0002 | 0.0006 | 0.0000 |

| Stream Name | 2nd Stg Fd | Utility SWP | P2 | Rej-2 Recycled | To TOX | Water Recy to Utility | P2 to SRU |
|---|---|---|---|---|---|---|---|
| Vapour/Phase Fraction | 1.00 | 1.00 | 1.00 | 1.00 | 1.00 | 0.00 | 1.00 |
| Temperature [F.] | 245 | 245 | 245 | 245 | 240 | 140 | 270 |

TABLE 6-4-continued

| | | | | | | | |
|---|---|---|---|---|---|---|---|
| Pressure [psig] | 30 | 0 | 0 | 30 | 30 | 0 | 15 |
| Molar Flow [MMSCFD] | 13.86 | 18 | 22.34 | 9.37 | 26.2 | 16.2 | 6.1 |
| | | | Mol Fraction | | | | |
| Nitrogen | 0.0111 | 0.0000 | 0.0000 | 0.0163 | 0.5889 | 0 | 0.0001 |
| $CO_2$ | 0.7731 | 0.0000 | 0.2121 | 0.64 | 0.0636 | 0.0003 | 0.775 |
| $H_2S$ | 0.01841 | 0.0000 | 0.00772 | 0.0089 | 0.0002 | 0.0000 | 0.02818 |
| $H_2O$ | 0.1968 | 1.0000 | 0.7802 | 0.3338 | 0.3138 | 0.9997 | 0.1968 |
| Other gases* | 0.0006 | 0.0000 | 0.0000 | 0.0009 | 0.0336 | 0.0000 | 0.0000 |

*Other gases: include argon (Ar), carbon monoxide (CO), hydrogen ($H_2$)

TABLE 6-5

| Gas Component | FTM (Gas/Nitrogen) |
|---|---|
| Nitrogen | 1.0 |
| $CO_2$ | 250 |
| $H_2S$ | 500 |
| $H_2O$ | 2190 |
| Other Gases ** | 1.0 |
| $H_2S$ Permeance (GPU) | 500 |

** Other gases: include argon (Ar), carbon monoxide (CO), hydrogen ($H_2$)

TABLE 6-6

| 1st Stage (FTM) | |
|---|---|
| Membrane size ($m^2$) | 21,356 |
| TG-Comp (MW)*** | 2.155 |
| 2nd Stage (FTM) | |
| Membrane size ($m^2$) | 2,022 |
| TG-Comp-2 (MW)*** | 0.886 |

***Polytropic efficiency~77.6%

As noted, the $2^{nd}$ stage membrane is swept with steam on the permeate side. For this, the pressure of the feed to the $2^{nd}$ stage membrane unit is kept at low pressure (30 psig). The lower pressure ratio is compensated for by sweeping the permeate side with steam. Nevertheless, the $H_2S$ in the stream recycled to feed the SRU (P2 to SRU) is concentrated to a mole fraction of 0.028, which is comparable to the $H_2S$ concentration obtained when a $H_2S$-selective membrane is deployed where higher feed pressure is needed (up to 125 psig) to achieve the same result as in Example 2.

The sulfur recovery of the overall process SRU+ SSMTGT:

% SRU recovery=(534.6*0.9997+168.2*0.9998+
    105.9*1.0+27.82*1.0)/
    (1098*0.7623)*100=99.91%

Example 7. SSMTGT $H_2S$ Route

This example illustrates the utilization of the SRU to produce part of the sweeping steam required by the SSMTGT, while the utility boiler of the plant is used to complement the sweeping steam requirement not produced by the SRU.

As noted in Example 6, the $1^{st}$ stage unit of the SSMTGT is swept with about 47 MMSCFD of low-pressure steam (0 psig, 245° F.). This steam is produced by integrating with the SRU and TOX waste heat boilers and condensers, as illustrated in FIG. 7.

Table 7-1 details the steam flow produced by the SRU and TOX waste heat boilers and condensers. Table 7-2 provides the power that can be produced in turbines T-1 and T-2 by expanding the high-pressure steam produced in the SRU and TOX waste heat boilers.

TABLE 7-1

| Stream Name | Water Recycled | Water Make-UP | Water to Steam Generation | St-1 | St-2 | St-3 |
|---|---|---|---|---|---|---|
| Vapor/Phase Fraction | 0.00 | 0.00 | 0.00 | 1.00 | 1.00 | 1.00 |
| Temp. [F.] | 140 | 120 | 218 | 715 | 250 | 250 |
| Pressure [psig] | 0 | 0 | 500 | 500 | 5 | 5 |
| Molar Flow [MMSCFD] | | | | 16.4 | 4.4 | 5.0 |
| Mass Flow [lb/hr] | 86,170 | 10,039 | 96,209 | 32,440 | 8,793 | 9,975 |

| Stream Name | St-4 | St-5 | St-6 | St-7 | Swp | Blow Down |
|---|---|---|---|---|---|---|
| Vapor/Phase Fraction | 1.00 | 1.00 | 1.00 | 1.00 | 1.00 | 1.00 |
| Temp. [F.] | 250 | 250 | 250 | 250 | 245 | 245 |
| Pressure [psig] | 5 | 5 | 5 | 500 | 0 | 0 |
| Molar Flow [MMSCFD] | 2.0 | 2.0 | 4.0 | 14.7 | 47.0 | 1.6 |
| Mass Flow [lb/hr] | 4,021 | 4,017 | 7,869 | 29,094 | 92,973 | 3,180 |

TABLE 7-2

| Turbine | Power Produced (MW)** |
|---|---|
| T-1 | 1.84 |
| T-2 | 1.72 |

**Polytropic efficiency~72%

Example 8. SSMTGT $SO_2$ Route

Figure 3B:
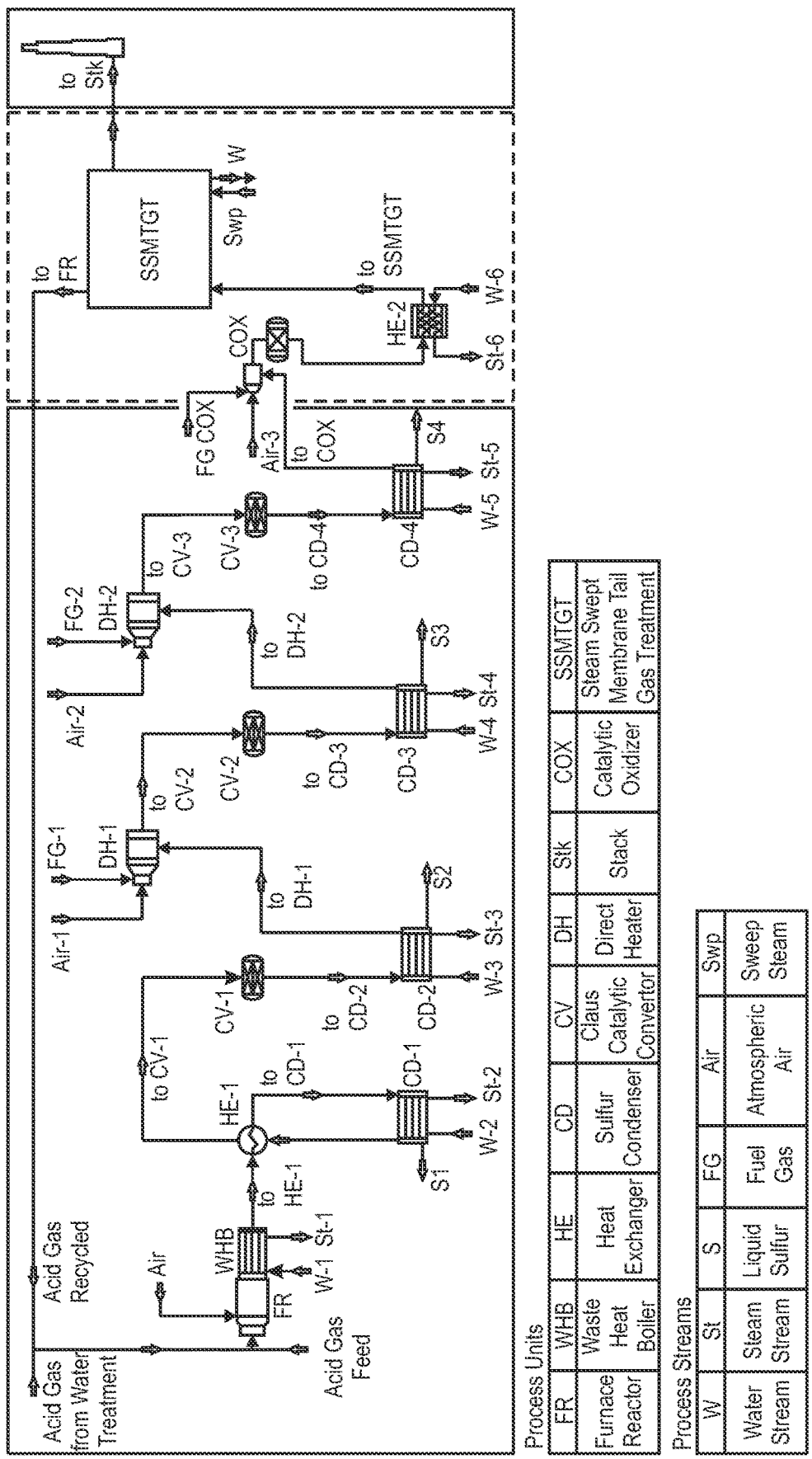
FIG. 3B is a schematic of a SRU comprising the $SO_2$ route of the SSMTGT process.
Figure 10:
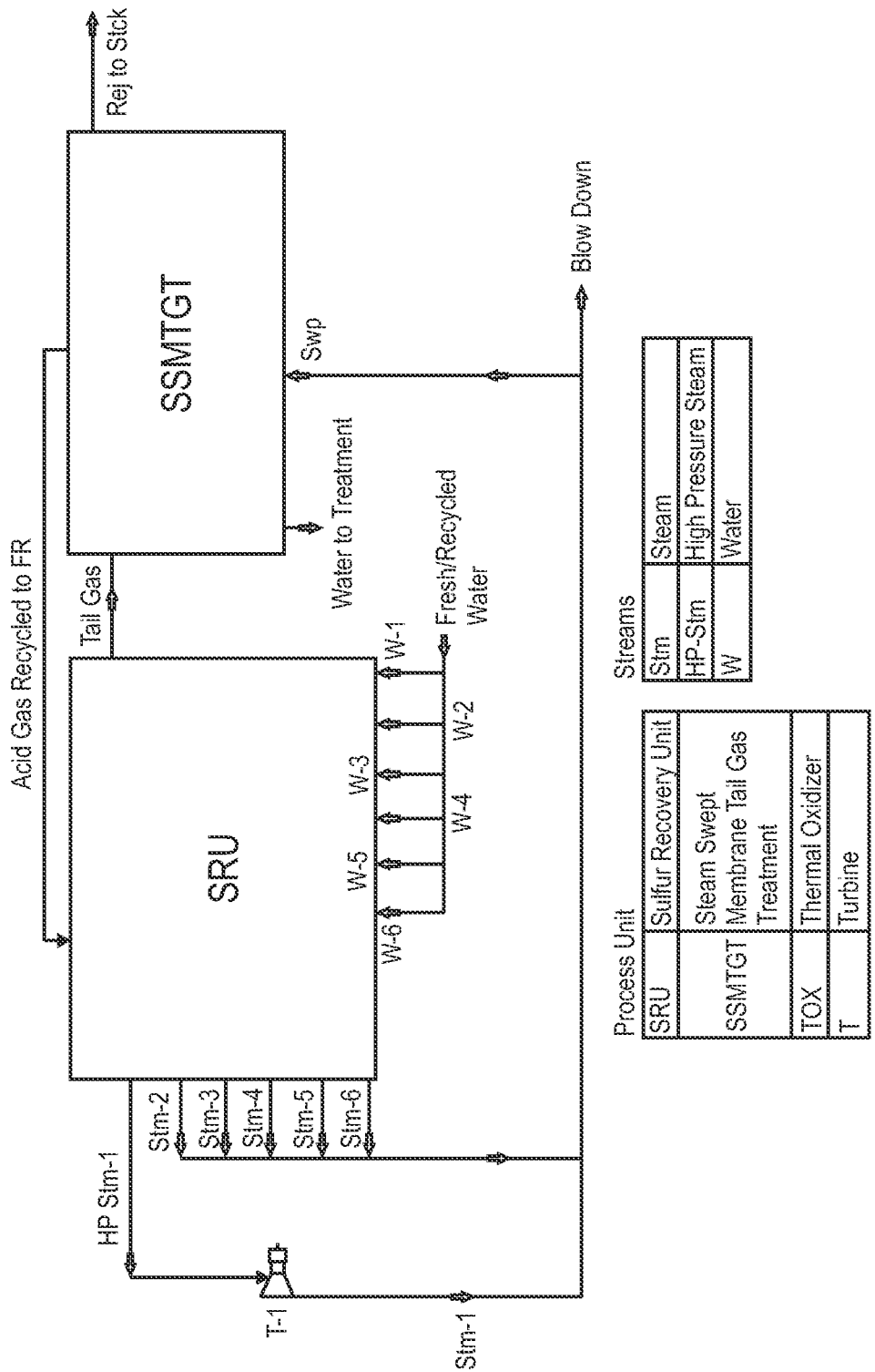
FIG. 10 is a schematic of a SSMTGT process integrated with SRU waste heat boilers and condensers.

This example illustrates the integration of the SSMTGT with SRU according to FIG. 3B, where all sulfur compounds are oxidized to $SO_2$. The SSMTGT is made of one stage that is swept with low pressure steam, as noted in FIG. 9. The reject stream from the SSMTGT is directed to the stack. TG-Comp-2 is needed to push the flashed gas from the Water Knock Drum to the furnace reactor FR. If the permeate stream pressure (P1) is high enough, then this compressor can be skipped. The permeate stream is used to economize the steam production by preheating the water stream directed to the steam generation. The SSMTGT is integrated with the SRU for steam production, as illustrated in FIG. 10.

Table 8-1 provides the mass balance around the SRU. Table 8-2 details Air and Fuel Gas streams of the SRU and TOX. Table 8-3 details the liquid sulfur produced in the condensers of the SRU. Table 8-4 shows material balance around the SSMTGT process. Table 8-5 shows integrated steam production in SRU waste heat boiler and condensers. Table 8-6 shows performance of $SO_2$-selective membrane. Table 8-7 shows membrane unit size and compression power required by the SSMTGT.

TABLE 8-1

| Stream Name | Acid Gas Feed | Acid Gas Recycled | FR | to HE-1 | to CD-1 | CD-1 out | to CV-1 | To CD-2 | to DH-1 |
|---|---|---|---|---|---|---|---|---|---|
| Vapor/Phase Fraction | 1.0 | 1.0 | 1.0 | 1.0 | 1.0 | 1.0 | 1.0 | 1.0 | 1.0 |
| Temp [F.] | 131 | 339 | 2062 | 800 | 620 | 355 | 595 | 679 | 332 |
| Pressure [psig] | 9.0 | 12.0 | 6.6 | 5.6 | 5.6 | 5.1 | 4.7 | 4.0 | 3.5 |
| Molar Flow [MMSCFD] | 10 | 4.2 | 31.9 | 30.3 | 30.1 | 29.5 | 29.5 | 29.2 | 29 |
| Mol Fraction | | | | | | | | | |
| Nitrogen | 0.0000 | 0.0001 | 0.0000 | 0.0000 | 0.0000 | 0.0000 | 0.0000 | 0.0000 | 0.0000 |
| $CO_2$ | 0.0000 | 0.0079 | 0.4075 | 0.4290 | 0.4310 | 0.4408 | 0.4408 | 0.4446 | 0.4482 |
| $H_2S$ | 0.1304 | 0.0742 | 0.0466 | 0.0491 | 0.0493 | 0.0504 | 0.0504 | 0.0543 | 0.0547 |
| COS | 0.7623 | 0.0000 | 0.0567 | 0.0597 | 0.0600 | 0.0613 | 0.0613 | 0.0346 | 0.0348 |
| $SO_2$ | 0.0000 | 0.0000 | 0.0016 | 0.0017 | 0.0017 | 0.0018 | 0.0018 | 0.0001 | 0.0001 |
| $CS_2$ | 0.0000 | 0.0478 | 0.0307 | 0.0323 | 0.0325 | 0.0332 | 0.0332 | 0.0173 | 0.0175 |
| $H_2O$ | 0.0000 | 0.0000 | 0.0016 | 0.0017 | 0.0017 | 0.0018 | 0.0018 | 0.0001 | 0.0001 |
| S1_Vapor | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0757 | 0.0045 | 0.0003 | 0.0000 | 0.0001 | 0.0006 | 0.0000 |
| S3_Vapor | 0.0000 | 0.0000 | 0.0005 | 0.0007 | 0.0001 | 0.0000 | 0.0000 | 0.0001 | 0.0000 |
| S4_Vapor | 0.0000 | 0.0000 | 0.0000 | 0.0004 | 0.0000 | 0.0000 | 0.0000 | 0.0000 | 0.0000 |
| S5_Vapor | 0.0000 | 0.0000 | 0.0000 | 0.0013 | 0.0005 | 0.0000 | 0.0000 | 0.0004 | 0.0000 |
| S6_Vapor | 0.0000 | 0.0000 | 0.0000 | 0.0090 | 0.0069 | 0.0002 | 0.0004 | 0.0031 | 0.0001 |
| S7_Vapor | 0.0000 | 0.0000 | 0.0000 | 0.0061 | 0.0051 | 0.0001 | 0.0002 | 0.0019 | 0.0000 |
| S8_Vapor | 0.0000 | 0.0000 | 0.0000 | 0.0057 | 0.0101 | 0.0006 | 0.0003 | 0.0024 | 0.0004 |
| Other gases** | 0.0094 | 0.0027 | 0.0290 | 0.0306 | 0.0307 | 0.0314 | 0.0314 | 0.0317 | 0.0319 |

| Stream Name | To CV-2 | to CD-3 | to DH-2 | to CV-3 | to CD-4 | To COX | to HE-2 | to SSMTGT | Acid Gas from Water Treatment |
|---|---|---|---|---|---|---|---|---|---|
| Vapor/Phase Fraction | 1.0 | 1.0 | 1.0 | 1.0 | 1.0 | 1.0 | 1.0 | 1.0 | 1.0 |
| Temp [F.] | 410 | 477 | 324 | 390 | 404 | 265 | 743 | 230 | 180 |
| Pressure [psig] | 3.5 | 2.4 | 1.9 | 1.4 | 1.4 | 1.2 | 0.7 | 0.7 | 0 |
| Molar Flow [MMSCFD] | 29.6 | 29.4 | 29.2 | 29.7 | 29.7 | 29.6 | 38.4 | 38.4 | 0.03 |
| Mol Fraction | | | | | | | | | |
| Nitrogen | 0.0000 | 0.0000 | 0.0000 | 0.0000 | 0.0000 | 0.0000 | 0.0200 | 0.0200 | 0.0000 |
| $CO_2$ | 0.4527 | 0.4560 | 0.4584 | 0.4620 | 0.4627 | 0.4634 | 0.5188 | 0.5188 | 0.0000 |
| $H_2S$ | 0.0554 | 0.0559 | 0.0562 | 0.0567 | 0.0568 | 0.0569 | 0.0535 | 0.0535 | 0.0000 |
| COS | 0.0341 | 0.0093 | 0.0094 | 0.0092 | 0.0041 | 0.0041 | 0.0000 | 0.0000 | 0.0000 |
| $SO_2$ | 0.0001 | 0.0000 | 0.0000 | 0.0000 | 0.0000 | 0.0000 | 0.0000 | 0.0000 | 0.4893 |
| $CS_2$ | 0.0171 | 0.0047 | 0.0047 | 0.0046 | 0.0021 | 0.0021 | 0.0053 | 0.0053 | 0.0000 |
| $H_2O$ | 0.0001 | 0.0001 | 0.0001 | 0.0001 | 0.0001 | 0.0001 | 0.0000 | 0.0000 | 0.5017 |
| S1_Vapor | 0.0000 | 0.0000 | 0.4389 | 0.4354 | 0.4411 | 0.4418 | 0.3745 | 0.3745 | 0.0000 |
| S2_Vapor | 0.0000 | 0.0000 | 0.0000 | 0.0000 | 0.0000 | 0.0000 | 0.0000 | 0.0000 | 0.0000 |
| S3_Vapor | 0.0000 | 0.0000 | 0.0000 | 0.0000 | 0.0000 | 0.0000 | 0.0000 | 0.0000 | 0.0000 |
| S4_Vapor | 0.0000 | 0.0000 | 0.0000 | 0.0000 | 0.0000 | 0.0000 | 0.0000 | 0.0000 | 0.0000 |
| S5_Vapor | 0.0000 | 0.0001 | 0.0000 | 0.0000 | 0.0000 | 0.0000 | 0.0000 | 0.0000 | 0.0000 |
| S6_Vapor | 0.0001 | 0.0014 | 0.0000 | 0.0000 | 0.0000 | 0.0000 | 0.0000 | 0.0000 | 0.0000 |

TABLE 8-1-continued

| | | | | | | | | | |
|---|---|---|---|---|---|---|---|---|---|
| S7_Vapor | 0.0001 | 0.0009 | 0.0001 | 0.0001 | 0.0004 | 0.0000 | 0.0000 | 0.0000 | 0.0000 |
| S8_Vapor | 0.0003 | 0.0032 | 0.0000 | 0.0001 | 0.0002 | 0.0000 | 0.0000 | 0.0000 | 0.0000 |
| Other gases** | 0.0315 | 0.0317 | 0.0318 | 0.0315 | 0.0315 | 0.0316 | 0.0279 | 0.0279 | 0.0000 |

**Other gases: hydrocarbons, argon (Ar), carbon monoxide (CO), hydrogen ($H_2$)

TABLE 8-2

| Stream Name | Air | Air-1 | Air-2 | Air-3 (COX Heater) | FG-1 | FG-2 | FG COX |
|---|---|---|---|---|---|---|---|
| Vapor/Phase Fraction | 1.0 | 1.0 | 1.0 | 1.0 | 1.0 | 1.0 | 1.0 |
| Temperature [F.] | 120 | 120 | 120 | 120 | 100 | 100 | 100 |
| Pressure [psig] | 9 | 9 | 9 | 9 | 50 | 50 | 50 |
| Molar Flow [MMSCFD] | 17.7 | 0.55 | 0.47 | 8.44 | 0.054 | 0.046 | 0.354 |
| Mol Fraction | | | | | | | |
| Argon | 0.0088 | 0.0088 | 0.0088 | 0.0088 | | | |
| Oxygen | 0.1964 | 0.1964 | 0.1964 | 0.1964 | | | |
| Nitrogen | 0.7320 | 0.7320 | 0.7320 | 0.7320 | 0.03 | 0.03 | 0.03 |
| $CO_2$ | 0.0003 | 0.0003 | 0.0003 | 0.0003 | 0.02 | 0.02 | 0.02 |
| $H_2O$ | 0.0626 | 0.0626 | 0.0626 | 0.0626 | | | |
| Hydrogen | | | | | 0.07 | 0.07 | 0.07 |
| Methane | | | | | 0.76 | 0.76 | 0.76 |
| Ethane | | | | | 0.07 | 0.07 | 0.07 |
| Propane | | | | | 0.05 | 0.05 | 0.05 |

TABLE 8-3

| Stream Name | S1 | S2 | S3 | S4 |
|---|---|---|---|---|
| Vapor/Phase Fraction | 0.0 | 0.0 | 0.0 | 0.0 |
| Temperature [F.] | 355 | 332 | 324 | 265 |
| Pressure [psig] | 5.1 | 3.5 | 1.9 | 1.2 |
| Molar Flow [lbmol/hr] | 515.4 | 164.4 | 122.9 | 33.79 |
| Mol Fraction | | | | |
| $H_2S$ | 0.0006 | 0.0002 | 0.0001 | 0.0000 |
| S_Liquid | 0.9994 | 0.9998 | 0.9999 | 1.0000 |

TABLE 8-4

| Stream Name | 1 st stg fd | Rej-1 to Stck | Swp | P1 | Recycle to FR | Water to Treatment |
|---|---|---|---|---|---|---|
| Vapor/Phase Fraction | 1.0 | 1.0 | 1 | 1 | 1.0 | 0.0 |
| Temperature [F.] | 245 | 245 | 245 | 245 | 339 | 205 |
| Pressure [psig] | 30 | 30 | 0 | 0 | 12 | 0 |
| Molar Flow [MMSCFD] | 38.2 | 34.7 | 37 | 40.5 | 4.1 | 36.4 |
| Volumetric Flow (Barrel/day) | | | | | | 4939 |
| Mol Fraction | | | | | | |
| Nitrogen | 0.5210 | 0.5726 | 0.0000 | 0.0008 | 0.0080 | 0.0000 |
| $CO_2$ | 0.0537 | 0.0496 | 0.0002 | 0.0077 | 0.0745 | 0.0000 |
| $SO_2$ | 0.0054 | 0.0002 | 0.0000 | 0.0049 | 0.0446 | 0.0014 |
| $H_2O$ | 0.3762 | 0.3300 | 0.9998 | 0.9862 | 0.8693 | 0.9986 |
| Other gases* | 0.0236 | 0.0257 | 0.0000 | 0.0003 | 0.0027 | 0.0000 |

*Other gases: include argon (Ar), carbon monoxide (CO), hydrogen ($H_2$)

TABLE 8-5

| Stream Name | Water to Steam Generation | St-1 | St-2 | St-3 | St-4 | St-5 | St-6 | Swp | Blow Down |
|---|---|---|---|---|---|---|---|---|---|
| Vapour/Phase Fraction | 0.00 | 1.00 | 1.00 | 1.00 | 1.00 | 1.00 | 1.00 | 1.00 | 1.00 |
| Temp. [F.] | 218 | 715 | 250 | 250 | 250 | 250 | 250 | 245 | 245 |
| Pressure [psig] | 500 | 500 | 5 | 5 | 5 | 5 | 5 | 0 | 0 |
| Molar Flow [MMSCFD] | | 15.6 | 4.08 | 4.81 | 2.13 | 1.92 | 9.49 | 37.0 | 1.01 |
| Mass Flow [lb/hr] | 75,190 | 30,870 | 8,070 | 9,519 | 4,204 | 3,798 | 18,770 | 73,190 | 2,000 |

TABLE 8-6

Membrane Selectivity

| Gas Component | (Gas/Nitrogen) |
|---|---|
| Nitrogen | 1.0 |
| $CO_2$ | 100 |
| $SO_2$ | 3000 |
| $H_2O$ | 3000 |
| Other Gases ** | 1.0 |

Membrane Permeance (GPU)

| | |
|---|---|
| $SO_2$ Permeance (GPU) | 1500 |

** Other gases: include argon (Ar), carbon monoxide (CO), hydrogen ($H_2$)

TABLE 8-7

| $1^{st}$ Stage $SO_2$-Selective Membrane Unit | |
|---|---|
| Membrane size (m²) | 17,375 |
| TG-Comp (MW)*** | 2.46 |
| TG-Comp-2*** | 0.15 |

***Polytropic efficiency~76.4%

TABLE 8-8

| Turbine | Power Produced (MW)** |
|---|---|
| T-1 | 1.77 |

**Polytropic efficiency~72%

As noted in Table 8-4 that the water precipitated in WKD at about 205° F. to maintain the majority of the $SO_2$ in the gas stream directed to the FR. However, the $SO_2$ dissolved in the water will be claimed later in the water treatment unit and recycled back to the FR (as noted in FIG. 3B).

The sulfur recovery of the overall process SRU+SSMTGT $$\% \; SRU \; \text{recovery} = (515.4*0.9994 + 164.4*0.9998 +$$
$$122.9*1.0 + 33.79*1.0)/(1098*0.7623)*100$$
$$= 99.90\%$$

Example 9. SSMTGT $SO_2$ Route

This example illustrates the integration of the SSMTGT with SRU according to FIG. 3B, where all sulfur compounds are oxidized to $SO_2$. The SSMTGT is made of two stages that are swept with low pressure steam, as noted in FIG. 11. The reject stream from the SSMTGT is directed to the stack. The permeate stream from the first stage is cooled to knock down water and the remained gas fraction, which is concentrated with $SO_2$, is compressed to about 30 psig by TG-Comp-2 to feed to the $2^{nd}$ stage. The $2^{nd}$ stage is swept with steam to compensate for the low pressure ratio across it. The reject of the $2^{nd}$ stage is recycled back to feed the $1^{st}$ stage, while the permeate stream (P2) is cooled to knock down water and the remained gas fraction is recycled back to the furnace reactor of the SRU through the boosted compressor TG-Comp-3. The SSMTGT is integrated with the SRU for steam production, as illustrated in FIG. 10. The produced sweep steam is split between the two stages as Swp-1 and Swp-2. The $SO_2$-selective membrane performance is shown Table 8-6.

Table 9-1 provides the mass balance around the SRU. Table 9-2 details Air and Fuel Gas streams of the SRU and TOX. Table 9-3 details the liquid sulfur produced in the condensers of the SRU. Table 9-4 shows material balance around the SSMTGT process. Table 9-5 shows integrated steam production in SRU waste heat boiler and condensers. Table 9-6 shows membrane unit size and compression power required by the SSMTGT. Table 9-7 shows power produced by expanding high pressure steam produced in WHB of SRU.

TABLE 9-1

| Stream Name | Acid Gas Feed | Acid Gas Recycled | FR | to HE-1 | to CD-1 | CD-1 out | to CV-1 | To CD-2 | to DH-1 |
|---|---|---|---|---|---|---|---|---|---|
| Vapor/Phase Fraction | 1.0 | 1.0 | 1.0 | 1.0 | 1.0 | 1.0 | 1.0 | 1.0 | 1.0 |
| Temp [F.] | 131 | 339 | 2062 | 800 | 620 | 355 | 595 | 679 | 332 |
| Pressure [psig] | 9.0 | 12.0 | 6.6 | 5.6 | 5.6 | 5.1 | 4.7 | 4.0 | 3.5 |
| Molar Flow [MMSCFD] | 10.0 | 4.2 | 31.9 | 30.3 | 30.1 | 29.5 | 29.5 | 29.2 | 29.0 |

TABLE 9-1-continued

| | Mol Fraction | | | | | | | | |
|---|---|---|---|---|---|---|---|---|---|
| Oxygen | | | | | | | | | |
| Nitrogen | 0.0000 | 0.0000 | 0.0000 | 0.0000 | 0.0000 | 0.0000 | 0.0000 | 0.0000 | 0.0000 |
| $CO_2$ | 0.0000 | 0.0001 | 0.4516 | 0.4819 | 0.4844 | 0.4983 | 0.4982 | 0.5021 | 0.5059 |
| $H_2S$ | 0.1304 | 0.0502 | 0.0404 | 0.0431 | 0.0433 | 0.0446 | 0.0446 | 0.0483 | 0.0487 |
| COS | 0.7623 | 0.0000 | 0.0516 | 0.0550 | 0.0553 | 0.0568 | 0.0568 | 0.0316 | 0.0318 |
| $SO_2$ | 0.0000 | 0.0000 | 0.0026 | 0.0027 | 0.0028 | 0.0028 | 0.0028 | 0.0001 | 0.0001 |
| $CS_2$ | 0.0000 | 0.1781 | 0.0275 | 0.0293 | 0.0295 | 0.0303 | 0.0303 | 0.0157 | 0.0158 |
| $H_2O$ | 0.0000 | 0.0000 | 0.0006 | 0.0006 | 0.0006 | 0.0006 | 0.0006 | 0.0000 | 0.0000 |
| S1_Vapor | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0931 | 0.0048 | 0.0003 | 0.0000 | 0.0001 | 0.0006 | 0.0000 |
| S3_Vapor | 0.0000 | 0.0000 | 0.0005 | 0.0008 | 0.0001 | 0.0000 | 0.0000 | 0.0001 | 0.0000 |
| S4_Vapor | 0.0000 | 0.0000 | 0.0000 | 0.0004 | 0.0000 | 0.0000 | 0.0000 | 0.0000 | 0.0000 |
| S5_Vapor | 0.0000 | 0.0000 | 0.0000 | 0.0015 | 0.0006 | 0.0000 | 0.0000 | 0.0003 | 0.0000 |
| S6_Vapor | 0.0000 | 0.0000 | 0.0000 | 0.0110 | 0.0083 | 0.0002 | 0.0004 | 0.0029 | 0.0001 |
| S7_Vapor | 0.0000 | 0.0000 | 0.0000 | 0.0077 | 0.0063 | 0.0001 | 0.0002 | 0.0018 | 0.0000 |
| S8_Vapor | 0.0000 | 0.0000 | 0.0000 | 0.0074 | 0.0129 | 0.0006 | 0.0003 | 0.0022 | 0.0004 |
| Other gases* | 0.0094 | 0.0002 | 0.0343 | 0.0366 | 0.0368 | 0.0379 | 0.0379 | 0.0382 | 0.0384 |

| Stream Name | To CV-2 | to CD-3 | to DH-2 | to CV-3 | to CD-4 | To COX | to HE-2 | to SSMTGT | Acid Gas from Water Treatment |
|---|---|---|---|---|---|---|---|---|---|
| Vapor/Phase Fraction | 1.0 | 1.0 | 1.0 | 1.0 | 1.0 | 1.0 | 1.0 | 1.0 | 1.0 |
| Temp [F.] | 410 | 477 | 324 | 390 | 404 | 265 | 743 | 230 | 180 |
| Pressure [psig] | 3.5 | 2.4 | 1.9 | 1.4 | 1.4 | 1.2 | 0.7 | 0.7 | 0.0 |
| Molar Flow [MMSCFD] | 29.6 | 29.4 | 29.2 | 29.7 | 29.7 | 29.6 | 38.4 | 38.4 | 0.0 |
| | Mol Fraction | | | | | | | | |
| Oxygen | | | 0.0000 | 0.0000 | 0.0000 | 0.0000 | 0.0200 | 0.0200 | 0.0000 |
| Nitrogen | 0.0000 | 0.0000 | 0.5151 | 0.5177 | 0.5184 | 0.5191 | 0.5610 | 0.5610 | 0.0000 |
| $CO_2$ | 0.5092 | 0.5127 | 0.0501 | 0.0508 | 0.0509 | 0.0509 | 0.0489 | 0.0489 | 0.0000 |
| $HS_2$ | 0.0495 | 0.0499 | 0.0083 | 0.0081 | 0.0037 | 0.0037 | 0.0000 | 0.0000 | 0.0000 |
| COS | 0.0312 | 0.0082 | 0.0000 | 0.0000 | 0.0000 | 0.0000 | 0.0000 | 0.0000 | 0.0000 |
| $SO_2$ | 0.0001 | 0.0000 | 0.0041 | 0.0040 | 0.0018 | 0.0018 | 0.0047 | 0.0047 | 0.4893 |
| $CS_2$ | 0.0155 | 0.0040 | 0.0000 | 0.0000 | 0.0000 | 0.0000 | 0.0000 | 0.0000 | 0.0000 |
| $H_2O$ | 0.0000 | 0.0000 | 0.3836 | 0.3811 | 0.3860 | 0.3865 | 0.3325 | 0.3325 | 0.5107 |
| S1_Vapor | 0.0000 | 0.0000 | 0.0000 | 0.0000 | 0.0000 | 0.0000 | 0.0000 | 0.0000 | 0.0000 |
| S2_Vapor | 0.0000 | 0.0000 | 0.0000 | 0.0000 | 0.0000 | 0.0000 | 0.0000 | 0.0000 | 0.0000 |
| S3_Vapor | 0.0000 | 0.0000 | 0.0000 | 0.0000 | 0.0000 | 0.0000 | 0.0000 | 0.0000 | 0.0000 |
| S4_Vapor | 0.0000 | 0.0000 | 0.0000 | 0.0000 | 0.0000 | 0.0000 | 0.0000 | 0.0000 | 0.0000 |
| S5_Vapor | 0.0000 | 0.0001 | 0.0000 | 0.0000 | 0.0000 | 0.0000 | 0.0000 | 0.0000 | 0.0000 |
| S6_Vapor | 0.0001 | 0.0013 | 0.0001 | 0.0001 | 0.0003 | 0.0000 | 0.0000 | 0.0000 | 0.0000 |
| S7_Vapor | 0.0001 | 0.0008 | 0.0000 | 0.0001 | 0.0002 | 0.0000 | 0.0000 | 0.0000 | 0.0000 |
| S8_Vapor | 0.0003 | 0.0030 | 0.0003 | 0.0003 | 0.0008 | 0.0001 | 0.0000 | 0.0000 | 0.0000 |
| Other gases* | 0.0378 | 0.0381 | 0.0383 | 0.0378 | 0.0379 | 0.0379 | 0.0328 | 0.0328 | 0.0000 |

*Other gases: hydrocarbons, argon (Ar), carbon monoxide (CO), hydrogen ($H_2$)

TABLE 9-2

| Stream Name | Air | Air-1 | Air-2 | Air-3 (COX Heater) | FG-1 | FG-2 | FG COX |
|---|---|---|---|---|---|---|---|
| Vapour/Phase Fraction | 1.0 | 1.0 | 1.0 | 1.0 | 1.0 | 1.0 | 1.0 |
| Temperature [F.] | 120 | 120 | 120 | 120 | 100 | 100 | 100 |
| Pressure [psig] | 9 | 9 | 9 | 9 | 50 | 50 | 50 |
| Molar Flow [MMSCFD] | 17.75 | 0.48 | 0.41 | 7.32 | 0.047 | 0.04 | 0.309 |

TABLE 9-2-continued

| Stream Name | Air | Air-1 | Air-2 | Air-3 (COX Heater) | FG-1 | FG-2 | FG COX |
|---|---|---|---|---|---|---|---|
| Mol Fraction | | | | | | | |
| Argon | 0.0088 | 0.0088 | 0.0088 | 0.0088 | | | |
| Oxygen | 0.1964 | 0.1964 | 0.1964 | 0.1964 | | | |
| Nitrogen | 0.7320 | 0.7320 | 0.7320 | 0.7320 | 0.03 | 0.03 | 0.03 |
| $CO_2$ | 0.0003 | 0.0003 | 0.0003 | 0.0003 | 0.02 | 0.02 | 0.02 |
| $H_2O$ | 0.0626 | 0.0626 | 0.0626 | 0.0626 | | | |
| Hydrogen | | | | | 0.07 | 0.07 | 0.07 |
| Methane | | | | | 0.76 | 0.76 | 0.76 |
| Ethane | | | | | 0.07 | 0.07 | 0.07 |
| Propane | | | | | 0.05 | 0.05 | 0.05 |

TABLE 9-3

| Stream Name | S1 | S2 | S3 | S4 |
|---|---|---|---|---|
| Vapor/Phase Fraction | 0.0 | 0.0 | 0.0 | 0.0 |
| Temperature [F.] | 355 | 332 | 324 | 265 |
| Pressure [psig] | 5.1 | 3.5 | 1.9 | 1.2 |
| Molar Flow [lbmol/hr] | 575.2 | 133.7 | 100.5 | 26.91 |
| Mol Fraction | | | | |
| $H_2S$ | 0.0005 | 0.0002 | 0.0000 | 0.0000 |
| S_Liquid | 0.9995 | 0.9998 | 1.0000 | 1.0000 |

TABLE 9-4

| Stream Name | 1st stg fd | Rej-1 to Stek | Swp-1 | P1 | 2nd StgFd | Rej-2 Recycled | Swp-2 | P2 | P2 to FR | Water to Treatment |
|---|---|---|---|---|---|---|---|---|---|---|
| Vapour/Phase Fraction | 1.0 | 1.0 | 1.0 | 1.0 | 1.0 | 1.0 | 1.0 | 0.0 | 1.0 | 0.0 |
| Temperature [F.] | 245 | 245 | 245 | 245 | 245 | 245 | 245 | 205 | 200 | 207 |
| Pressure [psig] | 30 | 30 | 0 | 0 | 30 | 30 | 0 | 0 | 12 | 0 |
| Molar Flow [MMSCFD] | 34.2 | 33.1 | 33 | 34.3 | 1.4 | 0.557 | 3.5 | 3.8 | 0.86 | 35.92 |
| Volumetric Flow (Barrel/day) | | | | | | | | | | 4867 |
| Mol Fraction | | | | | | | | | | |
| Nitrogen | 0.5568 | 0.5749 | 0.0000 | 0.0011 | 0.0267 | 0.0656 | 0.0000 | 0.0000 | 0.0001 | 0.0000 |
| $CO_2$ | 0.0569 | 0.0493 | 0.0002 | 0.0098 | 0.2438 | 0.5188 | 0.0002 | 0.0119 | 0.0526 | 0.0000 |
| $SO_2$ | 0.0048 | 0.0002 | 0.0000 | 0.0047 | 0.1072 | 0.0043 | 0.0000 | 0.0380 | 0.1633 | 0.0006 |
| $H_2O$ | 0.3357 | 0.3287 | 0.9998 | 0.9840 | 0.6101 | 0.3815 | 0.9998 | 0.9500 | 0.7838 | 0.9994 |
| Other gases* | 0.0458 | 0.0469 | 0.0000 | 0.0005 | 0.0122 | 0.0298 | 0.0000 | 0.0001 | 0.0002 | 0.0000 |

*Other gases: include argon (Ar), carbon monoxice (CO), hydrogen ($H_2$), oxygen ($O_2$)

TABLE 9-5

| Stream Name | Water to Steam Generation | St-1 | St-2 | St-3 | St-4 | St-5 | St-6 | Swp | Swp-1 | Swp-2 | Blow Down |
|---|---|---|---|---|---|---|---|---|---|---|---|
| Vapour/Phase Fraction | 0.00 | 1.00 | 1.00 | 1.00 | 1.00 | 1.00 | 1.00 | 1.00 | 1.00 | 1.00 | 1.00 |
| Temp. [F.] | 224 | 715 | 250 | 250 | 250 | 250 | 250 | 245 | 245 | 245 | 245 |
| Pressure [psig] | 500 | 500 | 5 | 5 | 5 | 5 | 5 | 0 | 0 | 0 | 0 |
| Molar Flow [MMSCFD] | | 17.0 | 3.6 | 4.3 | 1.8 | 1.7 | 8.2 | 36.66 | 33.0 | 3.0 | 0.66 |
| Mass Flow [lb/hr] | 72,619 | 33,648 | 7,174 | 8,474 | 3,598 | 3,321 | 16,235 | 72,449 | 65,279 | 5,934 | 2,000 |

TABLE 9-6

| 1st Stage SO$_2$-Selective Membrane Unit | |
|---|---|
| Membrane size (m$^2$) | 16,428 |
| TG-Comp (MW)*** | 2.17 |
| 2nd Stage SO$_2$-Selective Membrane Unit | |
| Membrane size (m$^2$) | 316 |
| TG-Comp-2*** | 0.27 |
| TG-Comp-3 *** | 0.032 |

***Polytropic efficiency~76.4%

TABLE 9-7

| Turbine | Power Produced (MW)** |
|---|---|
| T-1 | 1.93 |

**Polytropic efficiency~72%

% SRU recovery=(575.2*0.9995+133.7*0.9998+
100.5*1.0+26.91*1.0)/
(**1098*0.7623**)*100=99.90%

A number of implementations have been described. Nevertheless, it will be understood that various modifications may be made without departing from the spirit and scope of the disclosure.

What is claimed is:

1. A method for removing sulfur-containing compounds from a sulfur recovery unit (SRU) tail gas stream, the method comprising the steps of:
   a) introducing the SRU tail gas stream produced by the SRU to a sulfur-converting unit to produce a membrane feed;
   b) introducing the membrane feed to a sulfur membrane unit, the sulfur membrane unit comprising an acid gas-selective membrane, wherein the membrane feed comprises sulfur-containing compounds;
   c) allowing the membrane feed to contact a feed side of the acid gas-selective membrane such that sulfur-containing compounds permeate through the membrane to a permeate side;
   d) supplying a steam feed to the permeate side of the acid gas-selective membrane to produce a sulfur concentrated stream, wherein the sulfur concentrated stream comprises sulfur-containing compounds, and wherein the heat used to produce the steam feed is sourced from the SRU boiler; and
   e) collecting the retentate gases that fail to permeate through the membrane to produce a sulfur lean stream retentate, wherein the sulfur lean stream retentate comprises retentate gases.

2. The method of claim 1 further comprising:
   a) collecting the sulfur concentrated stream; and
   b) introducing the sulfur concentrated stream to the sulfur recovery unit, the sulfur recovery unit configured to produce the SRU tail gas stream.

3. The method of claim 1, wherein the temperature of the membrane feed is about 212° F. to about 350° F.

4. The method of claim 1, wherein the pressure of the steam feed is about 0 psig to about 1 psig.

5. The method of claim 1, wherein the temperature of the steam feed is about 212° F. to about 350° F.

6. The method of claim 1, wherein the SRU boiler is a waste heat boiler or a waste heat condenser.

7. The method of claim 1, wherein the acid gas-selective membrane separation is sweep driven.

8. The method of claim 1, wherein the sulfur-converting unit is a catalytic hydrogenation reactor, a catalytic oxidizer, or a thermal oxidizer.

9. The method of claim 1, wherein the sulfur-containing compounds comprise H$_2$S or SO$_2$.

10. The method of claim 1, wherein the acid gas-selective membrane allows for faster permeance of H$_2$S or SO$_2$ over other compounds in the membrane feed.

11. The method of claim 1, wherein the sulfur concentrated stream comprises H$_2$S or SO$_2$.

12. The method of claim 10, wherein the acid gas-selective membrane has a H$_2$S to N$_2$ permeance ratio of at least 1 and a H$_2$S to CO$_2$ permeance ratio of at least 1.

13. The method of claim 10, wherein the acid gas-selective membrane has a SO$_2$ to N$_2$ permeance ratio of at least 1 and a SO$_2$ to CO$_2$ permeance ratio of at least 1.

14. The method of claim 1, wherein the method comprising the steps of:
   a) introducing the SRU tail gas stream produced by the SRU to a catalytic hydrogenation reactor unit to produce a H$_2$S membrane feed;
   b) introducing the H$_2$S membrane feed to a sulfur membrane unit, the sulfur membrane unit comprising an H$_2$S selective membrane, wherein the membrane feed comprises H$_2$S;
   c) allowing the membrane feed to contact a feed side of the H$_2$S selective membrane such that H$_2$S permeates through the membrane to a permeate side;
   d) supplying a steam feed to the permeate side of the H$_2$S selective membrane to produce a H$_2$S concentrated stream, wherein the H$_2$S concentrated stream comprises H$_2$S, and wherein the heat used to produce the steam feed is sourced from the SRU boiler; and
   e) collecting the retentate gases that fail to permeate through the H$_2$S selective membrane to produce a H$_2$S lean stream, wherein the H$_2$S lean stream retentate comprises retentate gases.

15. The method of claim 1, wherein the method comprises the steps of:
   a) introducing the SRU tail gas stream to a catalytic oxidizer or a thermal oxidizer unit to produce a SO$_2$ membrane feed;
   b) introducing the SO$_2$ membrane feed to a sulfur membrane unit, the sulfur membrane unit comprising an SO$_2$ selective membrane, wherein the membrane feed comprises SO$_2$;
   c) allowing the membrane feed to contact a feed side of the SO$_2$ selective membrane such that SO$_2$ permeates through the membrane to a permeate side;
   d) supplying a steam feed to the permeate side of the SO$_2$ selective membrane to produce a SO$_2$ concentrated stream, wherein the SO$_2$ concentrated stream comprises SO$_2$, and wherein the heat used to produce the steam feed is sourced from the SRU boiler; and
   e) collecting the retentate gases that fail to permeate through the SO$_2$ selective membrane to produce a SO$_2$ lean stream retentate, wherein the SO$_2$ lean stream comprises retentate gases.

16. An apparatus to remove sulfur-containing compounds from a sulfur recovery unit (SRU) tail gas stream, the apparatus comprising:
   a) a sulfur-converting unit configured to produce a membrane feed; and
   b) a membrane unit fluidly connected to the converting unit, the membrane unit comprising an acid gas-selective membrane, wherein the membrane feed contacts a feed side of the acid gas-selective membrane such that the sulfur-containing compounds present in the membrane feed permeate through the acid gas-selective membrane to a permeate side, wherein the permeate side is swept with steam forming a sulfur rich stream, and wherein the heat used to produce the steam is sourced from the SRU boiler.

17. The apparatus of claim 16, further comprising a sulfur recovery unit, the sulfur recovery unit fluidly connected to the sulfur-converting unit, the sulfur recovery unit configured to produce the SRU tail gas stream.

18. The apparatus of claim 16, wherein the sulfur-converting unit is a reducing unit, comprising:
  a) a reducing unit configured to produce a membrane feed, wherein the membrane feed comprises $H_2S$; and
  b) a membrane unit fluidly connected to the reducing unit, the membrane unit comprising a $H_2S$ selective membrane, wherein the membrane feed contacts a feed side of the membrane such that the $H_2S$ present in the membrane feed permeates through the $H_2S$ selective membrane to a permeate side, wherein the permeate side is swept with steam forming a sulfur rich stream, and wherein the heat used to produce the steam is sourced from an SRU boiler.

19. The apparatus of claim 16, wherein the sulfur-converting unit is an oxidizing unit, comprising:
  a) an oxidizing unit configured to produce a membrane feed, wherein the membrane feed comprises $SO_2$; and
  b) a membrane unit fluidly connected to the oxidizing unit, the membrane unit comprising a $SO_2$ selective membrane, wherein the membrane feed contacts a feed side of the $SO_2$ selective membrane such that the $SO_2$ present in the membrane feed permeates through the membrane to a permeate side, wherein the permeate side is swept with steam forming a sulfur rich stream, and wherein the heat used to produce the steam is sourced from an SRU boiler.

\* \* \* \* \*